(12) United States Patent
Siomina et al.

(10) Patent No.: US 11,716,640 B2
(45) Date of Patent: *Aug. 1, 2023

(54) METHOD, APPARATUS, AND COMPUTER-READABLE MEDIUM FOR PROVIDING SYNCHRONIZATION SIGNAL BLOCK (SSB) TRANSMISSION PATTERN

(71) Applicant: Telefonaktiebolaget LM Ericsson (publ), Stockholm (SE)

(72) Inventors: Iana Siomina, Täby (SE); Icaro L. J. Da Silva, Solna (SE); Helka-Liina Määttänen, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/680,671

(22) Filed: Feb. 25, 2022

(65) Prior Publication Data

US 2022/0182852 A1 Jun. 9, 2022

Related U.S. Application Data

(63) Continuation of application No. 16/317,675, filed as application No. PCT/SE2018/051160 on Nov. 13, 2018, now Pat. No. 11,304,072.

(Continued)

(51) Int. Cl.
*H04W 24/02* (2009.01)
*H04W 76/28* (2018.01)
(Continued)

(52) U.S. Cl.
CPC .......... *H04W 24/02* (2013.01); *H04W 24/10* (2013.01); *H04W 56/001* (2013.01); *H04W 76/28* (2018.02)

(58) Field of Classification Search
CPC ... H04W 24/02; H04W 24/10; H04W 56/001; H04W 76/28; H04W 16/28
See application file for complete search history.

(56) References Cited

U.S. PATENT DOCUMENTS 9,768,925 B2 9/2017 Kim et al.
2013/0021999 A1 1/2013 Jiang
(Continued)

FOREIGN PATENT DOCUMENTS

CN 103039108 A 4/2013
CN 103125133 A 5/2013
(Continued)

OTHER PUBLICATIONS

"3GPP TS 38.300 V1.1.1", 3rd Generation Partnership Project; Technical Specification Group Radio Access Network; NR; NR and NG-RAN Overall Description; Stage 2 (Release 15), Oct. 2017, pp. 1-60.

(Continued)

*Primary Examiner* — Habte Mered
(74) *Attorney, Agent, or Firm* — Murphy, Bilak & Homiller, PLLC

(57) ABSTRACT

Embodiments include methods performed by a second network node in a wireless communications network that includes a first network node, the second network node, and a third network node. Such methods include receiving, from the first network node, a configuration comprising a pattern indicative of whether or not each of a plurality of Synchronization Signal Block (SSB) transmissions, that are configured based on a nominal timing, are actually transmitted by the third network node according to the nominal timing. Such methods include, based on the received configuration, managing transmission and/or reception configurations for one or more of the following: one or more cells served by the second network node; and one or more UEs served by the (Continued)

901. Obtain configuration comprising a pattern indicative of whether or not one or more transmissions transmitted by a third network node actually are transmitted,

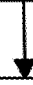

902. Send the configuration to first network node.

second network node via the one or more cells. Other embodiments include second network nodes configured to perform such methods.

21 Claims, 17 Drawing Sheets

Related U.S. Application Data

(60) Provisional application No. 62/586,925, filed on Nov. 16, 2017.

(51) Int. Cl.
*H04W 24/10* (2009.01)
*H04W 56/00* (2009.01)

(56) References Cited

U.S. PATENT DOCUMENTS

| | | |
|---|---|---|
| 2013/0059610 A1 | 3/2013 | Siomina et al. |
| 2013/0065612 A1 | 3/2013 | Siomina et al. |
| 2013/0235738 A1 | 9/2013 | Siomina et al. |
| 2013/0273878 A1 | 10/2013 | Heo et al. |
| 2014/0349664 A1 | 11/2014 | Pedersen et al. |
| 2015/0103784 A1 | 4/2015 | Lorca Hernando |
| 2018/0324022 A1 | 11/2018 | Sheng et al. |
| 2018/0324023 A1 | 11/2018 | Zeng et al. |
| 2018/0376438 A1 | 12/2018 | Islam et al. |
| 2019/0363809 A1 | 11/2019 | Yoon et al. |
| 2020/0022040 A1 | 1/2020 | Chen et al. |
| 2020/0059810 A1 | 2/2020 | Harada et al. |
| 2020/0067755 A1 | 2/2020 | Pan et al. |
| 2020/0068420 A1 | 2/2020 | Chen et al. |
| 2020/0092907 A1 | 3/2020 | Yi |
| 2020/0100301 A1 | 3/2020 | Kusashima et al. |

FOREIGN PATENT DOCUMENTS

| | | |
|---|---|---|
| CN | 103875301 A | 6/2014 |
| CN | 104205673 A | 12/2014 |
| JP | 2019004342 A | 1/2019 |
| WO | 2018204665 A1 | 11/2018 |

OTHER PUBLICATIONS

"On remaining details of synchronization signal", 3GPP TSG RAN WG1 Meeting 90bis; R1-1717713; Prague, Czech Republic, Oct. 9-13, 2017, pp. 1-7.
"Remaining details related to SS blocks", 3GPP TSG-RAN WG1 NR AH#3; R1-1716523; Nagoya, Japan, Sep. 18-21, 2017, pp. 1-11.
"SS Block Based RRM Measurement", 3GPP TSG RAN WG1 Meeting #90; R1-1713132; Prague, Czech Republic, Aug. 21-25, 2017, pp. 1-5.
"SS Burst Set signaling design", 3GPP TSG RAN WG1 NR #90; R1-1712523; Prague, Czech Republic, Aug. 21-25, 2017, pp. 1-3.
"Discussion and evaluation on NR RRM measurement based on SS block", 3GPP TSG RAN WG1 Meeting #89, R1-1708444, Hangzhou, P.R. China, May 15-19, 2017, pp. 1-8.
"Summary of Key Issues and Proposals for 7.1.5.1", 3GPP TSG RAN WG1#90b, R1-1718858, Prague, Czech Republic, Oct. 9-13, 2017, pp. 1-7.

Non-centralized

Co-sited

Centralized

Shared

Time: t1    t2    ...    tn

Tx beam sweeping on 2 subarrays.

Time: t1  t2  ...  tn

Tx beam sweeping on 3 subarrays.

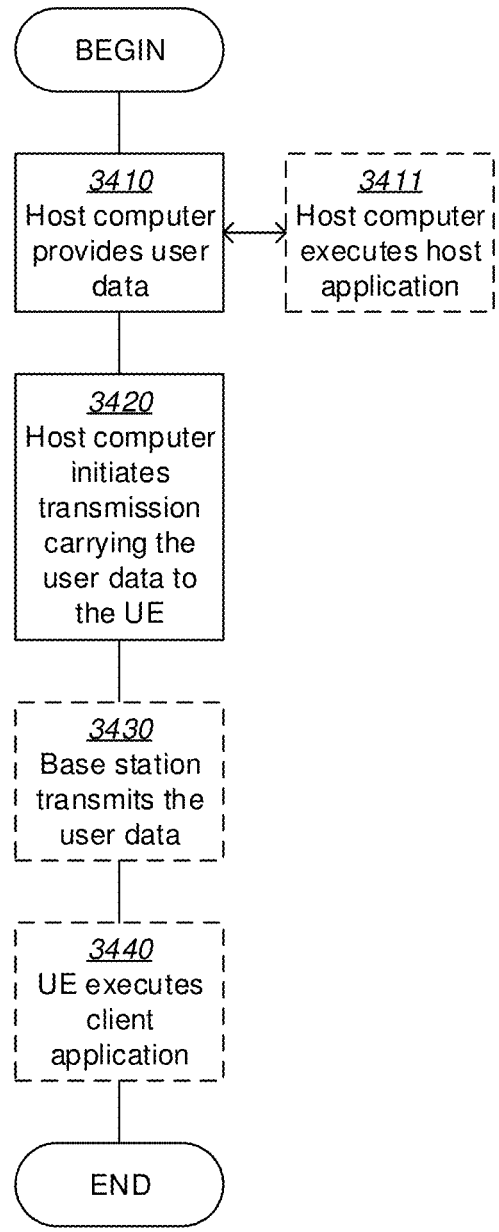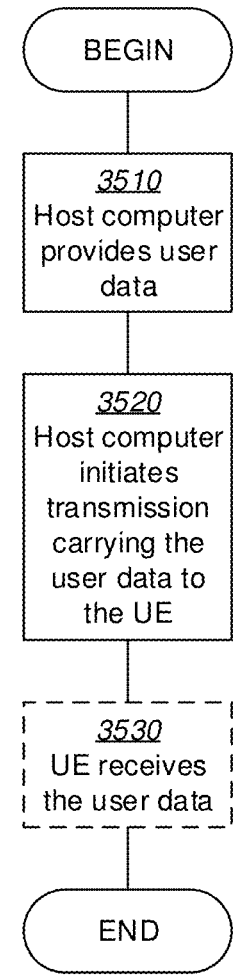
Fig. 16
Fig. 17

METHOD, APPARATUS, AND COMPUTER-READABLE MEDIUM FOR PROVIDING SYNCHRONIZATION SIGNAL BLOCK (SSB) TRANSMISSION PATTERN

CROSS-REFERENCE TO RELATED APPLICATION(S)

This application is a continuation of and claims the benefit of priority from U.S. patent application Ser. No. 16/317,675 filed on Jan. 14, 2019, which is a U.S. national-stage entry of international application PCI/SE2018/051160 filed on Nov. 13, 2018, which claims the benefit of priority from U.S. Provisional Patent Application 62/586,925 filed Nov. 16, 2017. The entire disclosures of the above-mentioned applications are incorporated herein by reference for all purposes.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

NR Architecture

New Radio (NR), a.k.a. 5G or Next Generation, architecture is being discussed in 3GPP and the current concept is illustrated in FIG. 1, where eNB denotes LTE eNodeB, gNB and ng-eNB (or evolved eNB) denote NR BSs (one NR BS may correspond to one or more transmission/reception points), and the lines between the nodes illustrate the corresponding interfaces which are under discussion in 3GPP. FIG. 1 depicts NR architecture from 3GPP TS 38.300, v.1.0.1.

Further, FIG. 2 illustrates NR deployment example scenarios with NR BS which are discussed in 3GPP. The examples relate to Non-centralized, Co-sited, Centralized and shared NR deployment.

Multi-Antenna Schemes in NR

Multi-antenna schemes for NR are currently being discussed in 3GPP.

For NR, frequency ranges up to 100 GHz are considered. It is known that high-frequency radio communication above 6 GHz suffers from significant path loss and penetration loss. One solution to address this issue is to deploy large-scale antenna arrays to achieve high beamforming gain, which is a reasonable solution due to the small wavelength of high-frequency signal. Therefore MIMO schemes for NR are also called massive MIMO. For around 30/70 GHz, up to 256 Tx and Rx antenna elements are assumed. Extension to support 1024Tx at 70 GHz is agreed and it is under discussion for 30 GHz. For sub-6 GHz communication, to obtain more beamforming and multiplexing gain by increasing the number of antenna elements is also a trend.

With massive MIMO, three approaches to beamforming have been discussed: analogue, digital, and hybrid (a combination of the two). The analogue beamforming would compensate high pathloss in NR scenarios, while digital precoding would provide additional performance gains similar to MIMO for sub-6 GHz necessary to achieve a reasonable coverage. The implementation complexity of analogue beamforming is significantly less than digital precoding since it is in many implementations relies on simple phase shifters, but the drawbacks are its limitation in multi-direction flexibility (i.e., a single beam may be formed at a time and the beams are then switched in time domain), only wideband transmissions (i.e., not possible to transmit over a subband), unavoidable inaccuracies in the analogue domain, etc. Digital beamforming (requiring costly converters to/from the digital domain from/to IF domain), used today in LTE, provides the best performance in terms of data rate and multiplexing capabilities (multiple beams over multiple sub bands at a time may be formed), but at the same time it is challenging in terms of power consumption, integration, and cost; in addition to that the gains do not scale linearly with the number of transmit/receive units while the cost is growing rapidly. Supporting hybrid beamforming, to benefit from cost-efficient analogue beamforming and high-capacity digital beamforming, is therefore desirable for NR. An example diagram for hybrid beamforming is shown in FIG.

3. Beamforming may be on transmission beams and/or reception beams, network side or UE side.

Beam Sweeping

The analog beam of a subarray may be steered toward a single direction on each OFDM symbol, and hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose has been called "beam sweeping". For analog and hybrid beamforming, the beam sweeping seems to be essential to provide the basic coverage in NR. For this purpose, multiple OFDM symbols, in which differently steered beams may be transmitted through subarrays, may be assigned and periodically transmitted. FIG. 4 depicts Transmission (Tx) beam sweeping on 2 subarrays, and FIG. 5 depicts Tx beam sweeping on 3 subarrays.

Synchronization Signal (SS) Block Configuration

Herein is described, a non-limiting example if SS block and SS burst configuration which may be assumed in other embodiments. The signals comprised in SS block may be used for measurements on NR carrier, including intra-frequency, inter-frequency and inter-RAT (i.e., NR measurements from another RAT).

SS block (may also be referred to as SS/Physical Broadcast Channel (PBCH) block or SSB): NR—Primary Synchronization Signal (PSS), NR—Secondary Synchronization Signal (SSS) and/or NR-PBCH may be transmitted within an SS block. For a given frequency band, an SS block corresponds to N Orthogonal Frequency Division Multiplexing (OFDM) symbols based on one subcarrier spacing (e.g., default or configured), and N is a constant. UE shall be able to identify at least OFDM symbol index, slot index in a radio frame and radio frame number from an SS block. A single set of possible SS block time locations (e.g., with respect to radio frame or with respect to SS burst set) is specified per frequency band. At least for multi-beams case, at least the time index of SS-block is indicated to the UE. The position(s) of actual transmitted SS-blocks may be informed for helping CONNECTED/IDLE mode measurement, for helping CONNECTED mode UE to receive DL data/control in unused SS-blocks and potentially for helping IDLE mode UE to receive DL data/control in unused SS-blocks.

SS burst: One or multiple SS block(s) compose an SS burst. The maximum number of SS-blocks, L, within SS burst set may or may not be carrier frequency dependent, e.g.:

The maximum number of SS-blocks within SS burst set, L, for different frequency ranges are For frequency range up to 3 GHz, L is 4
For frequency range from 3 GHz to 6 GHz, L is 8
For frequency range from 6 GHz to 52.6 GHz, L is 64

SS burst set: One or multiple SS burst(s) further compose an SS burst set (or series) where the number of SS bursts within a SS burst set is finite. From physical layer specification perspective, at least one periodicity of SS burst set is supported. From UE perspective, SS burst set transmission is periodic. At least for initial cell selection, UE may assume a default periodicity of SS burst set transmission for a given carrier frequency (e.g., one of 5 ms, 10 ms, 20 ms, 40 ms, 80 ms, or 160 ms). UE may assume that a given SS block is repeated with a SS burst set periodicity. By default, the UE may neither assume the gNB transmits the same number of physical beam(s), nor the same physical beam(s) across different SS-blocks within an SS burst set. In a special case, an SS burst set may comprise one SS burst.

For each carrier, the SS blocks may be time-aligned or overlap fully or at least in part, or the beginning of the SS blocks may be time-aligned (e.g., when the actual number of transmitted SS blocks is different in different cells).

(Note that the final terminology captured in 3GPP technical specifications for the SS block concept may be not exactly the same as in this section, since the first NR specifications are not yet ready.)

FIG. 6 depicts an Example configuration of SS blocks, SS bursts and SS burst sets/series.

All SS blocks within a burst set are within 5 ms window, but the number of SS blocks within such window depends on the numerology (e.g., up to 64 SS blocks with 240 kHz subcarrier spacing).

Based on SS blocks, the UE may perform cell identification, radio measurements, RLM, system information reading, etc. A UE receives intra-frequency SS blocks and performs corresponding intra-frequency operations for serving cell(s) and intra-frequency neighbour cells (in carrier aggregation or dual connectivity the UE may have one or more serving cells), and inter-frequency SS blocks and performs corresponding inter-frequency operations for inter-frequency neighbour cells.

The intra- and inter-frequency measurements are defined as follows:

SSB based intra-frequency measurement: A measurement is defined as a SSB based intra-frequency measurement provided the center frequency of the SSB of the serving cell indicated for measurement and the center frequency of the SSB of the neighbour cell are the same, and the subcarrier spacing of the two SSBs are also the same.

SSB based inter-frequency measurement: A measurement is defined as a SSB based inter-frequency measurement provided the center frequency of the SSB of the serving cell indicated for measurement and the center frequency of the SSB of the neighbour cell are different, or the subcarrier spacing of the two SSBs are different.

An SS block may be associated with a specific beam, e.g., SS block #x is transmitted via beam #y.

SUMMARY

As a part of developing embodiments herein a problem of the bitmap solution will first be identified and discussed.

Some of the SS blocks within an SS burst set may actually be not transmitted at pre-defined locations. The UE may be aware of the actually transmitted SS blocks of the serving cell but not of other cells, while the other cells even on the same carrier frequency but also on a different carrier frequency may have a different set of the actually transmitted SS blocks which the UE is currently not aware of. Furthermore, SS block burst sets may be transmitted on multiple frequency for the same cell (which sometimes is also described as multiple SS blocks per cell).

It is currently unclear what is the set of actually transmitted SS blocks in case of multiple SS blocks per cell When identifying or measuring neighbour cells, if the UE is not aware of the actually transmitted SS blocks, the UE has to blindly or semi-blindly detect all SS blocks, while going through all candidate SS block locations within the 5 ms window. Transmitted SS blocks may still be not detected by a UE due to low signal level (e.g., if the SS block is transmitted via a beam pointing in an opposite direction) but attempting to detect SS blocks that are not transmitted is a waste of UE resources and time, which is especially critical when the number of SS blocks may be large, e.g., up to 64 in the higher frequency range. Furthermore, the UE would need to do this for each cell to measure, intra-frequency or inter-frequency, since the UE cannot assume the same SS block pattern in all cells.

A BS serving the UE is not aware of the SS block transmission pattern or beam transmission pattern of a neighbour BS. Hence, some settings in the measurement configuration that the serving BS may set that may be a function of number of beams in detectable neighbour cells cannot be properly tuned by the serving BS, such as maximum number of beam measurement information to be reported per cell, maximum number of beam measurements for cell quality derivation, etc. Neither the BS may assist the UE in identifying or measuring neighbour cells, e.g. to reduce the UE complexity and make the measurements/detection faster Currently the UE cannot receive the information about actually transmitted SS blocks from a core network, e.g., a positioning node, when performing positioning measurements.

A core network node (positioning node) is not aware of the transmission pattern of SS blocks or beams of a radio BS which are transmitting radio signals that may be used for positioning, and hence cannot assist the UE in making it aware of which SS blocks are actually transmitted or not when the UE is requested to perform positioning measurements involving neighbour cell. Therefore, prior to performing a positioning measurement, the UE first have to correctly detect the signal which is complex at low signal quality when the UE needs to measure on many neighbour cells (e.g., in LTE, the UE shall be able to perform measurements down to −13 dB).

An object of embodiments herein is to improve the way of managing configuration of neighbouring cells in a wireless communications network.

According to a first aspect of embodiments herein, the object is achieved by a method performed by a first network node for managing a configuration of neighbouring cells in a wireless communications network. The first network node and a third network node operate in the wireless communications network. The first network node obtains a configuration comprising a pattern indicative of whether or not one or more transmissions transmitted by a third network node actually are transmitted. The transmissions comprises any one out of Synchronization Signal, SS, blocks and beams.

The first network node then manages the configuration of neighbouring cells, based on the received configuration, i.e. the obtained configuration.

According to another aspect of embodiments herein, the object is achieved by a method performed by User Equipment, UE, for handling a configuration of neighbouring cells in a wireless communications network. The UE, a first network node, and a third network node operate in the wireless communications network. The UE obtains a configuration comprising a pattern indicative of whether or not one or more transmissions transmitted by a third network node actually are transmitted. The transmissions comprises any one out of Synchronization Signal, SS, blocks and beams, The UE then send the configuration to the first network node.

According to another aspect of embodiments herein, the object is achieved by a method performed by a second network node for managing a configuration of neighbouring cells in a wireless communications network. A first network node, the second network node and a third network node operate in the wireless communications network. The second network node receives from the first network node, a configuration comprising a pattern, indicative of whether or not one or more transmissions transmitted by a third network node actually are transmitted. The transmissions comprises any one out of Synchronization Signal, SS, blocks and beams.

The second network node then manages the configuration of neighbouring cells, based on the received configuration.

According to another aspect of embodiments herein, the object is achieved by a first network node for managing a configuration of neighbouring cells in a wireless communications network communications system. The first network node and a third network node are operable in the wireless communications network. The first network node is configured to:

Obtain a configuration comprising a pattern indicative of whether or not one or more transmissions transmitted by a third network node actually are transmitted, wherein the transmissions is adapted to comprise any one out of Synchronization Signal, SS, blocks and beams, and send the configuration to a second network node.

According to another aspect of embodiments herein, the object is achieved by a User Equipment, UE, for handling a configuration of neighbouring cells in a wireless communications network. The UE, a first network node, and a third network node are operable in the wireless communications network. The UE 120 is configured to:

Obtain a configuration adapted to comprise a pattern indicative of whether or not one or more transmissions transmitted by a third network node actually are transmitted, wherein the transmissions are adapted to comprise any one out of Synchronization Signal, SS, blocks and beams, and send, the configuration to the first network node.

According to another aspect of embodiments herein, the object is achieved by a second network node for handling a configuration of neighbouring cells in a wireless communications network, wherein a first network node, the second network node and a third network node are operable in the wireless communications network. The second network node is configured to:

Receive, from the first network node, a configuration adapted to comprise a pattern indicative of whether or not one or more transmissions transmitted by a third network node actually are transmitted, wherein the transmissions is adapted to comprise any one out of Synchronization Signal, SS, blocks and beams, and manage the configuration of neighbouring cells, based on the received configuration.

BRIEF DESCRIPTION OF THE DRAWINGS

Examples of embodiments herein are described in more detail with reference to attached drawings in which:

FIGS. 16 to 19 are flowcharts illustrating methods implemented in a communication system including a host computer, a base station and a user equipment.

DETAILED DESCRIPTION

Figure 1:
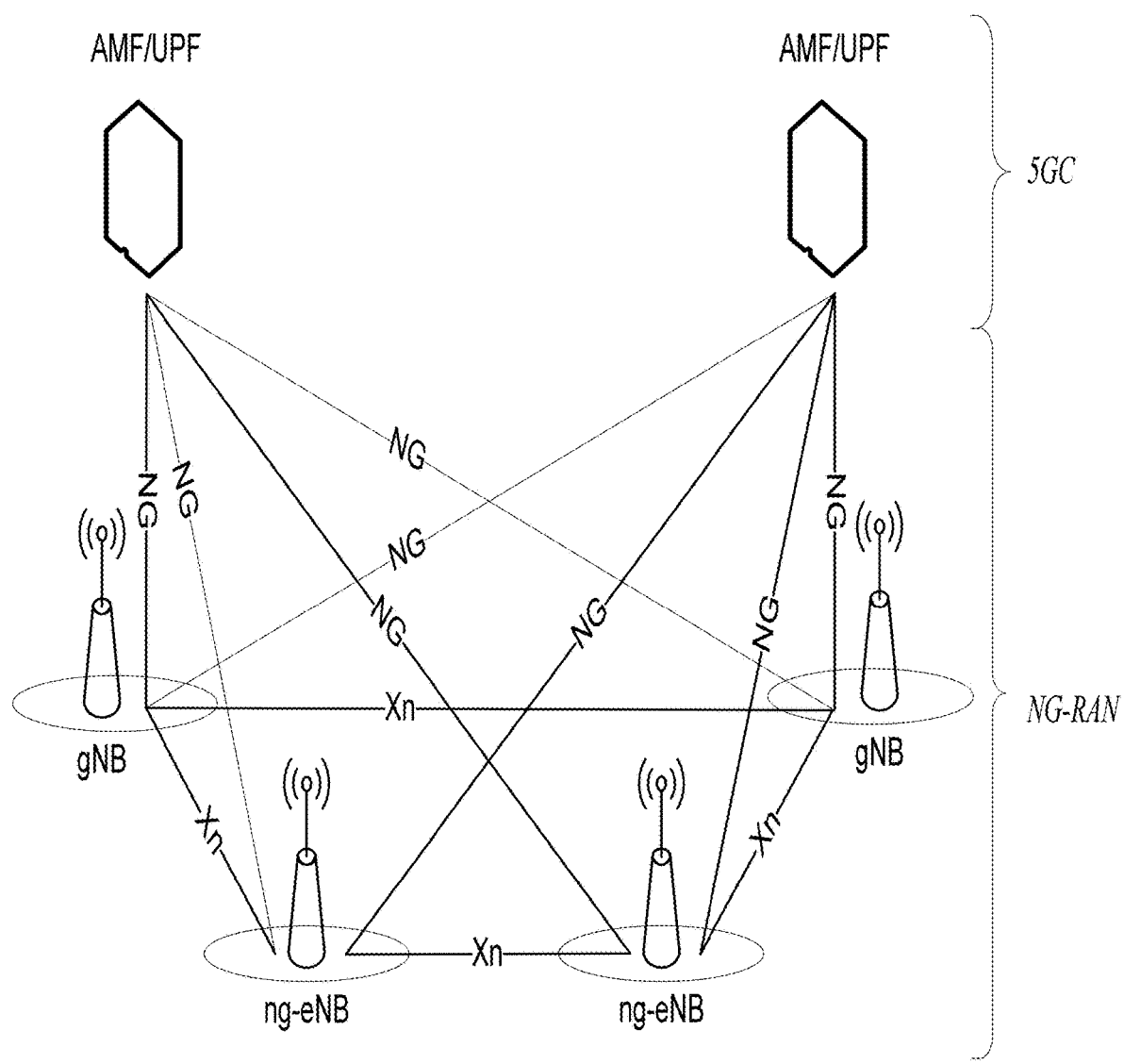
FIG. 1 is a schematic block diagram illustrating prior art.
Figure 2:
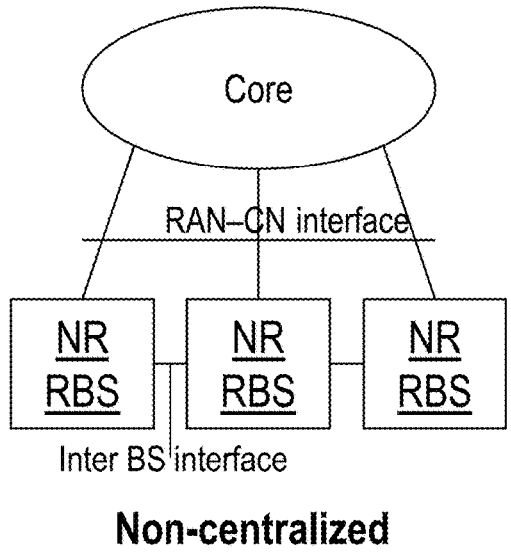
FIG. 2 is a schematic block diagram illustrating prior art.
Figure 2:
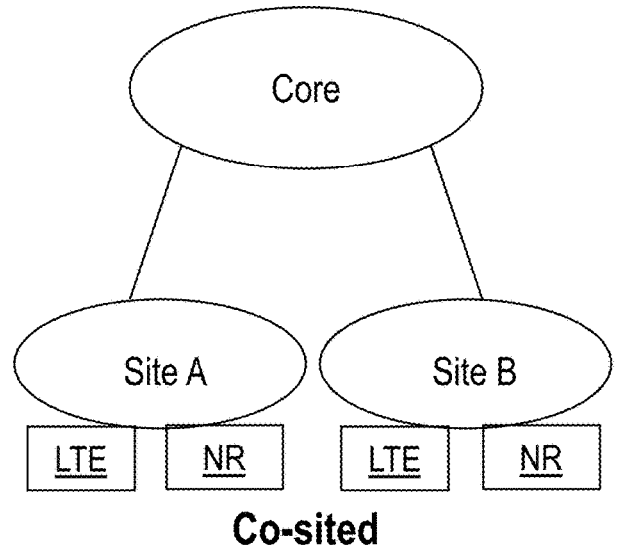
Figure 2:
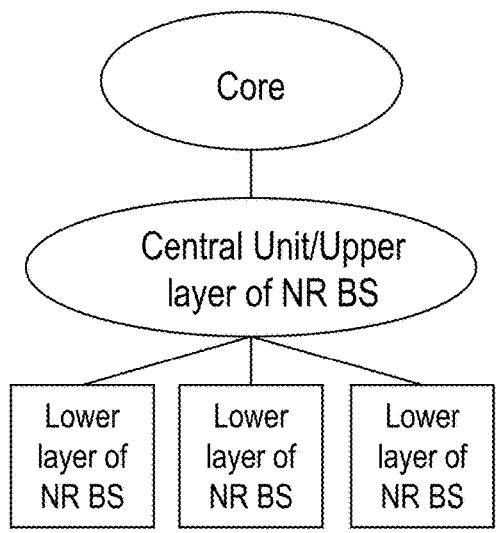
Figure 2:
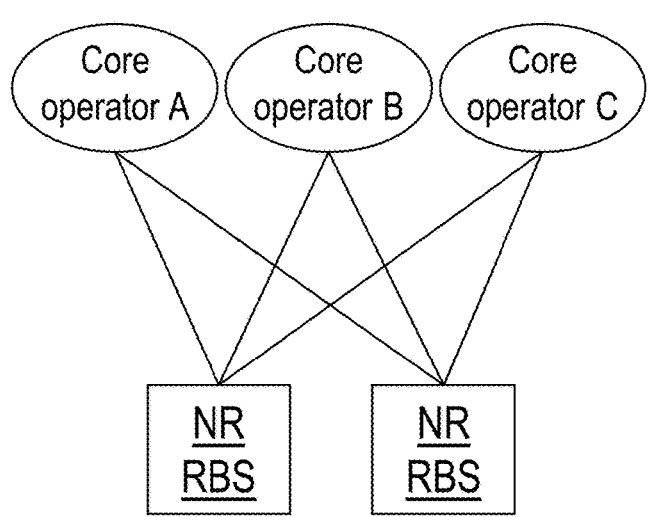
Figure 3:
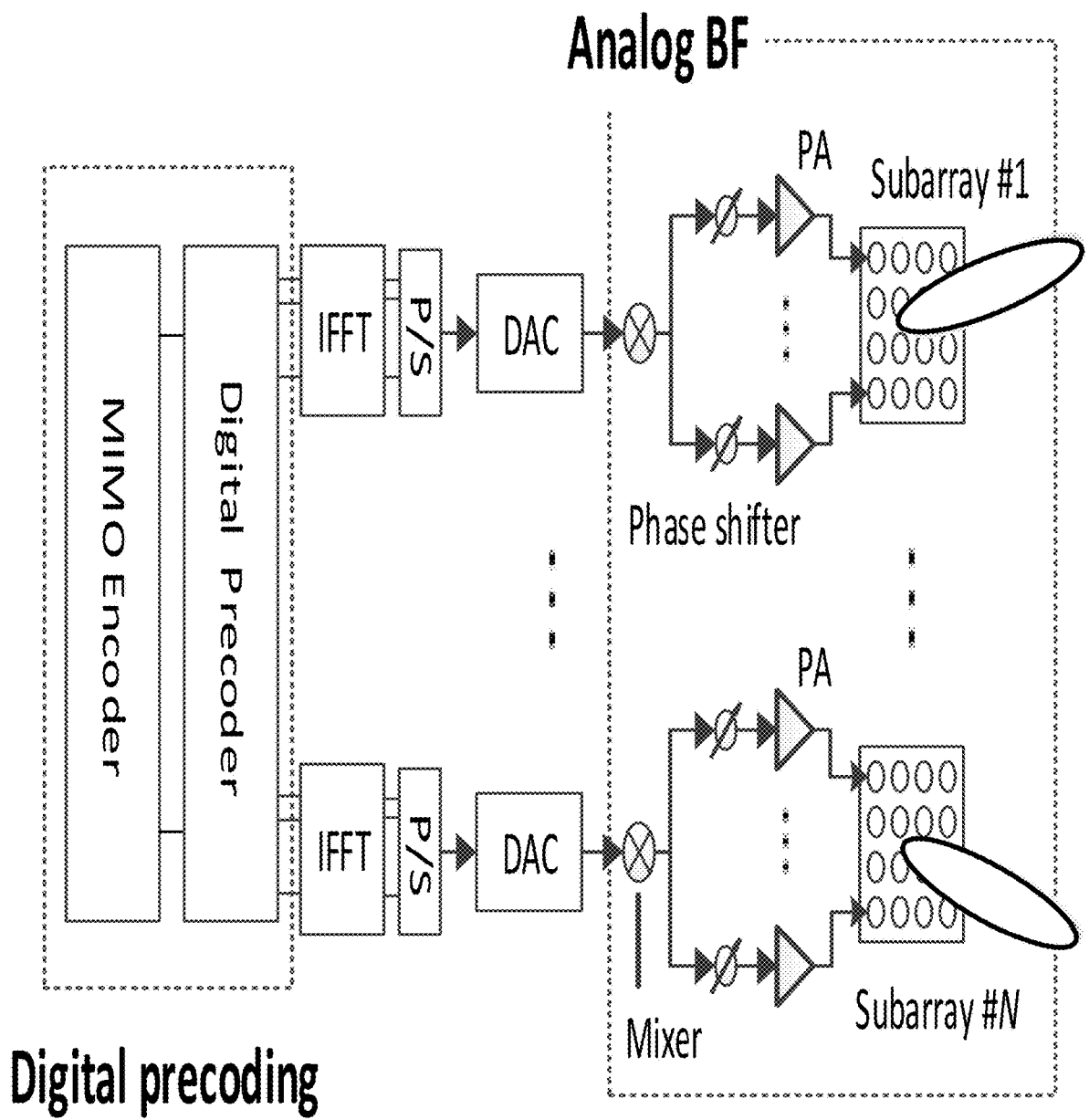
FIG. 3 is a schematic block diagram illustrating prior art.
Figure 4:
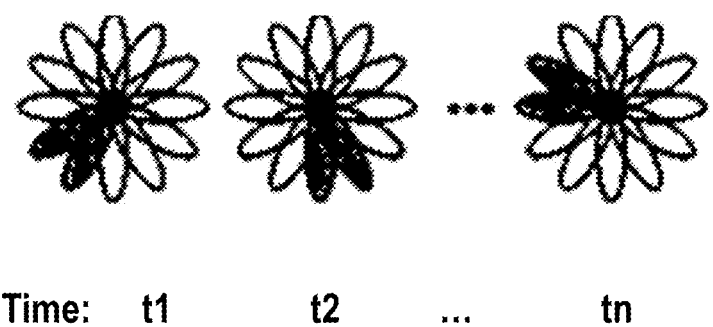
FIG. 4 is a schematic block diagram illustrating prior art.
Figure 5:
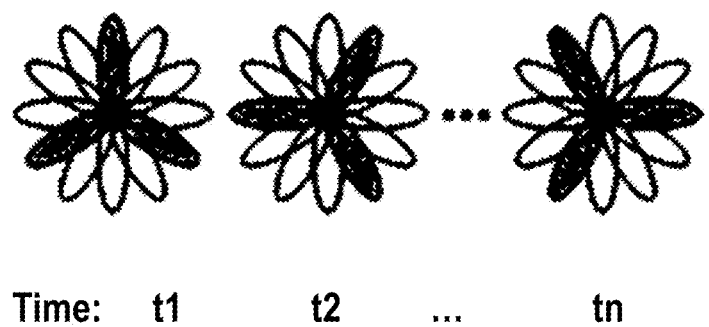
FIG. 5 is a schematic block diagram illustrating prior art.
Figure 6:
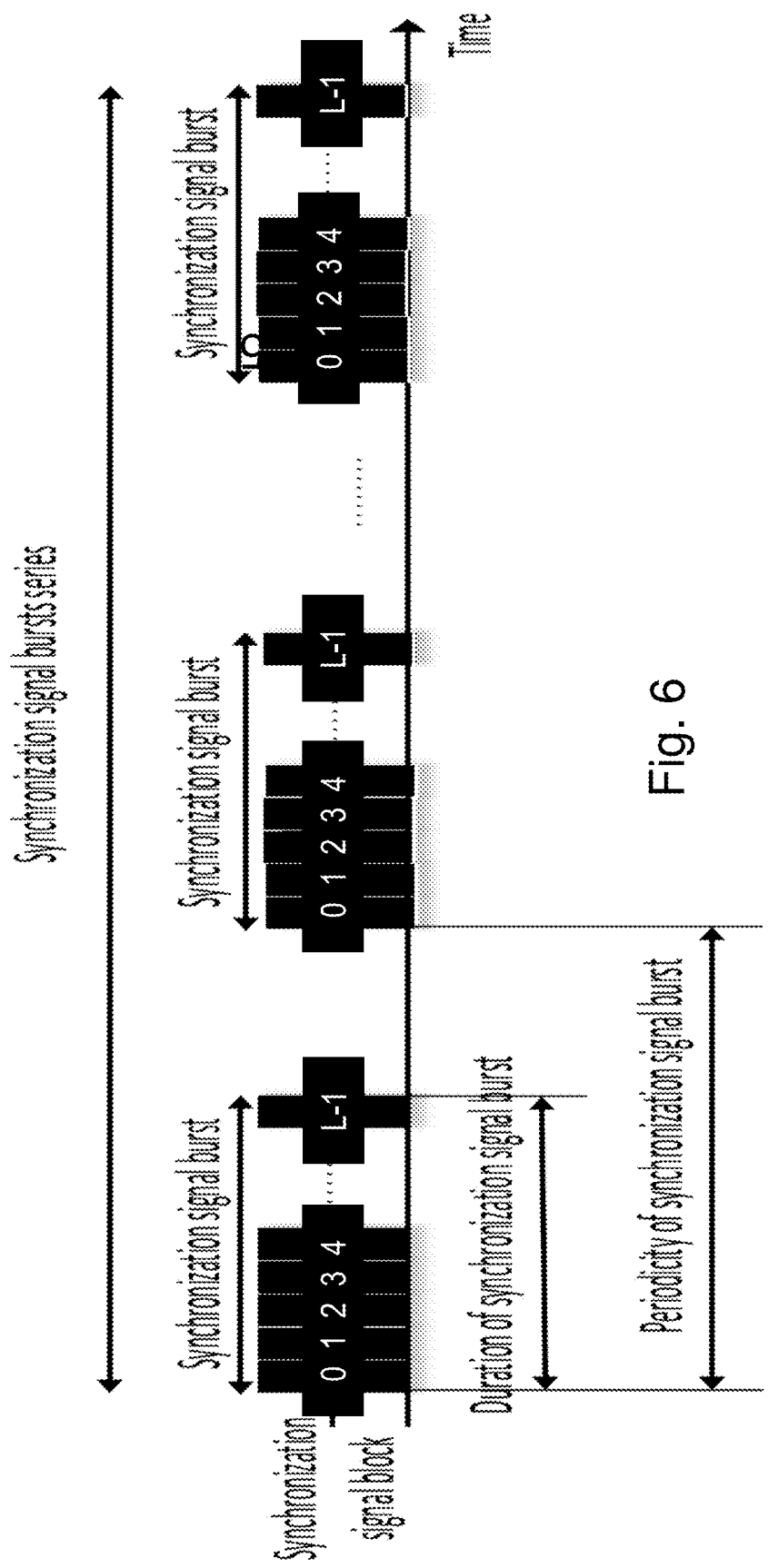
FIG. 6 is a schematic block diagram illustrating prior art.

According to a first embodiment, a first network node, e.g., a first Base Station (BS) provides or indicates to a second network node, e.g., a second BS, a core network node, and/or a positioning node, an SS block or beam configuration comprising one or a group of patterns indicative of which SS blocks or beams transmitted by a third network node, e.g., the first BS or a third BS, are:
  actually transmitted and/or actually not transmitted, e.g., a transmission pattern, and/or
  available and/or not available for UE measurements e.g., a measurement pattern which is always either the same or a subset of the transmission pattern, i.e., an SS block or beam cannot be measured if it is not transmitted. E.g., some SS blocks or beams may be transmitted but subject to high interference or may be not suitable for the UE measurements for some other reason.

Thus according to the first embodiment, the first network node, provides or indicates to a second network node, an SS block or beam configuration comprising one or a group of patterns indicative of which SS blocks or beams transmitted by a third network node, are—actually transmitted and/or actually not transmitted, and/or—available and/or not available for UE measurements.

The actually transmitted SSBs or SSBs available for measurements may be per frequency or per cell.

Or there may be a combination of per frequency indication of SSBs and additional per cell indication of SSBs.

According to another, embodiment, the first network node receives from a UE, the SS block or beam configuration comprising one or a group of patterns indicative of which SS blocks or beams that are transmitted by a third network node.

Embodiments herein may provide the following advantages:
  By knowing the SSB and/or beam configuration, (e.g. the number of transmitted beams, nominal SSB position being used, etc.) for a given cell and/or cells in a given measurement object, a serving BS such as a network node may configure the UE with proper beam related parameters such as maximum number of beam measurements to be averaged for cell quality derivation or maximum number of beams to be reported, etc.

A measurement object when used herein e.g. means a Radio Resource Management (RRM) measurement related network configuration to the UE which describes e.g. target frequency to measure and certain assisting information for perform the measurements.

UE complexity and resource consumption may be significantly reduced if the network informs the UE about actually transmitted SS blocks in neighbour cells.

Some of the example embodiments herein relates to Methods for Managing SS Block Configuration of Neighbour Cells.

Terminology

In some embodiments a non-limiting term "UE" is used. The UE herein may be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It may be any kind of network node which may comprise of a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

The term "BS" may comprise, e.g., gNB or nr-eNB or a relay node, or any BS compliant with the embodiments.

The term "radio node" used herein may be used to denote a UE or a radio network node.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio measurements may be absolute or relative. Radio measurement may be called as signal level which may be signal quality and/or signal strength. Radio measurements may be e.g. intra-frequency, inter-frequency, inter-RAT measurements, CA measurements, etc. Radio measurements may be unidirectional (e.g., DL or UL) or bidirectional (e.g., RTT, Rx-Tx, etc.). Some examples of radio measurements: timing measurements (e.g., TOA, timing advance, RTT, RSTD, Rx-Tx, propagation delay, etc.), angle measurements (e.g., angle of arrival), power-based measurements (e.g., received signal power, RSRP, received signal quality, RSRQ, SINR, SNR, interference power, total interference plus noise, RSSI, noise power, etc.), cell detection or cell identification, radio link monitoring (RLM), system information (SI) reading, etc.

Performing a measurement on a carrier may imply performing measurements on signals of one or more cells operating on that carrier or performing measurements on signals of the carrier (aka carrier specific measurement e.g. RSSI). Examples of cell specific or beam specific measurements are signal strength, signal quality etc.

The term measurement performance used herein may refer to any criteria or metric which characterizes the performance of the measurement performed by a radio node. The term measurement performance is also called as measurement requirement, measurement performance requirements etc. The radio node has to meet one or more measurement performance criteria related to the performed measurement. Examples of measurement performance criteria are measurement time, number of cells to be measured with the measurement time, measurement reporting delay, measurement accuracy, measurement accuracy wrt a reference value (e.g. ideal measurement result) etc. Examples of measurement time are measurement period, cell detection or cell identification period, evaluation period, beam detection or beam identification period, etc.

The term numerology here may comprise any one or a combination of: subcarrier spacing, number of subcarriers within a bandwidth, resource block size, symbol length, CP length, etc. In one specific non-limiting example, numerology comprises subcarrier spacing of 7.5 kHz, 15 kHz, 30 kHz, 60 kHz, 120 kHz, or 240 kHz. In another example, numerology is the CP length which may be used with subcarrier spacing 30 kHz or larger.

Figure 7:
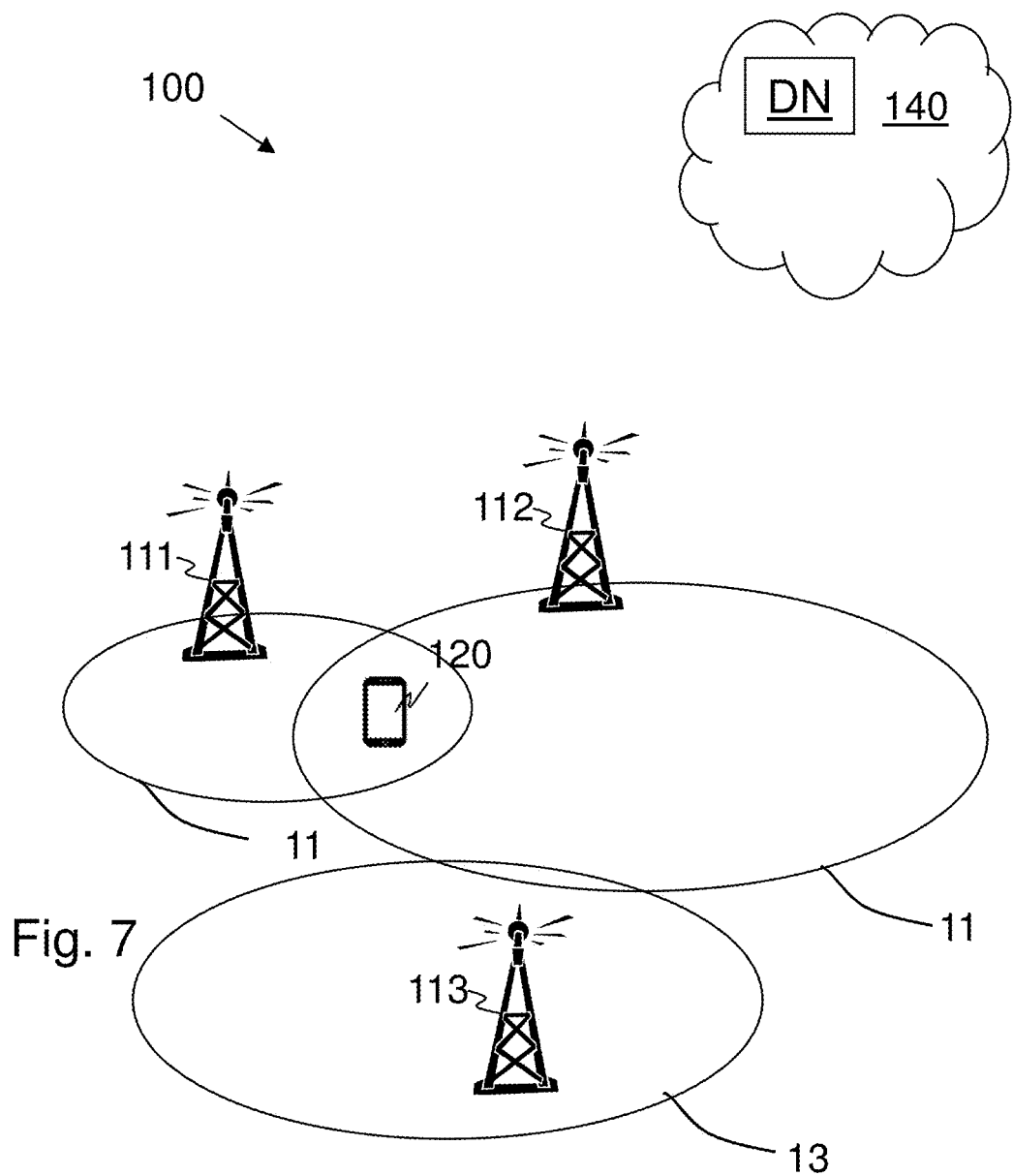
FIG. 7 is a schematic block diagram illustrating embodiments of a wireless communications network.

Embodiments herein relate to wireless communication networks in general. FIG. 7 is a schematic overview depicting a wireless communications network 100. The wireless communications network 100 may use NR but may further use a number of different technologies, such as, 5G, NB-IoT, CAT-M, Wi-Fi, eMTC, Long Term Evolution (LTE), LTE-Advanced Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a first network node 111 providing radio coverage over a geographical area, a cell 11, a second network node 112 and a third network node 113 providing radio coverage over a respective geographical area, a cell 11, cell 12, cell 13, in which cells UEs are served. In some embodiments the third network node 113 is the same network node as the first network node 111. The cells 11, 12 and 13 may also be referred to as a service area, beam or a group of beams. The network nodes 111, 112, 113 may be a transmission and reception point e.g. according to the terminology mentioned above. The network nodes 111, 112, 113 may communicate with any UEs they serve with Downlink (DL) transmissions to the UEs and Uplink (UL) transmissions from the UEs.

Wireless devices such as e.g. a UE 120 operate in the wireless communications network 100. The UE 120 is a device e.g. according to the terminology mentioned above such as an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 111, one or more Access Networks (AN), e.g. RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Methods according to embodiments herein may be performed by the network node 111. As an alternative, a Distributed Node DN and functionality, e.g. comprised in a cloud 140 as shown in FIG. 7 may be used for performing or partly performing the methods.

Figure 8:
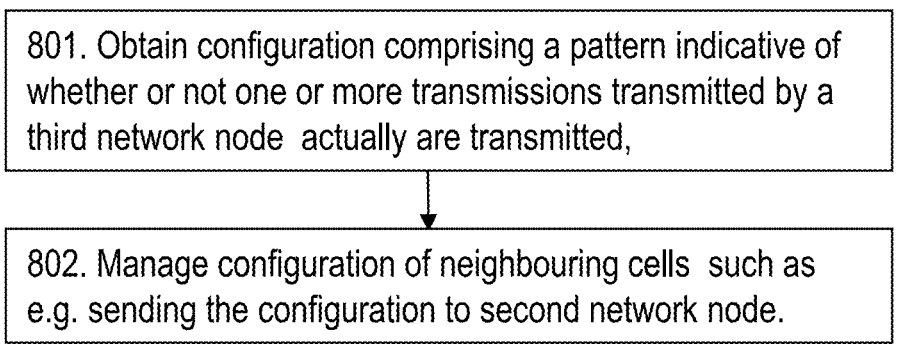
FIG. 8 is a flowchart depicting embodiments of a method in a first network node.

Example embodiments of a method performed by a first network node 111 e.g. for managing a configuration, such as e.g. an SS Block configuration, of neighbour cells in a wireless communications network 100, e.g. a NR communications system, will now be described with reference to a flowchart depicted in FIG. 8. The first network node 111, a third network node 113 and in some embodiments a second network node 112 operate in the wireless communications network 100. It should be noted that in some embodiments, the third network node 113 is the same network node as the first network node 111.

Some related embodiments will be described later on in this document.

The method may comprise one or more of the following actions which actions may be taken in any suitable order.

In short, the method comprises one or more of the following actions: In Action 801 the first network node 111 obtains a configuration comprising a pattern indicative of whether or not one or more transmissions transmitted by a third network node 113 actually are transmitted, wherein the transmissions comprises any one out of Synchronization Signal, SS, blocks and beams.

In Action 802, the first network node 111 sends the configuration to the second network node 112.

In more detail, the method comprises one or more of the following actions: The actions will be yet further explained in paragraphs after the method actions.

Action 801.

The first network node 111 obtains, also referred to as receives, a configuration comprising a pattern indicative of whether or not one or more transmissions transmitted by a third network node 113 actually are transmitted. The transmissions comprises any one out of SS blocks or beams.

The pattern may comprise any one out of: One pattern, and a group of patterns. Thus the pattern may comprise one pattern or a group of patterns.

The pattern may comprises any one out of: a pattern of transmissions and a pattern of UE measurements. Thus the pattern may be a pattern of transmissions or a pattern of UE measurements.

The pattern indicative of whether or not the one or more transmissions actually are transmitted may in some embodiments be represented by a pattern indicative of whether or not the one or more transmissions actually are available for UE measurements.

The configuration may be of any one or more out of: an SS block configuration and a beam configuration. Thus the configuration may be a SS block configuration or a beam configuration.

The obtained configuration may be obtained by being any one out of: Decided by the first network node 111, received from one or more UEs 120, and received from the third network node 113. Thus the obtained configuration may be obtained by being decided by the first network node 111, being received from one or more UEs 120, or being received from the third network node 113.

Action 802.

The first network node 111 then manages the configuration of neighbouring cells, based on the received configuration, also referred to as the obtained configuration.

The managing of the configuration of neighbouring cells, based on the received configuration may comprise performing one or more out of:

Sending all or a part of the received configuration to another network node, —sending all or a part of the received configuration to one or more UEs,
configuring measurement gaps,
configuring measurement cycles,
configuring Discontinuous Reception (DRX),
updating one or more measurement objects
reporting configurations for one or more UEs,
configuring the set of SSBs for measurements,
configuring measurement gaps for one or more UEs,
configuring one or more own transmissions,
determining a common set of actually transmitted SSBs by all or at least N cells in a set of cells,
determining a common set of SSBs not transmitted by any cell in a set of cells,
determining a load characteristic or metric based on whether the SSB is transmitted in a neighbour e.g. interfering, cell or not,
determining a load characteristic or metric based on whether the SSB is transmitted in a neighbour, e.g. interfering, cell or not, or
sending the configuration to a second network node 112, wherein as mentioned above, the second network node 112 operate in the wireless communications network 100.

Figure 9:
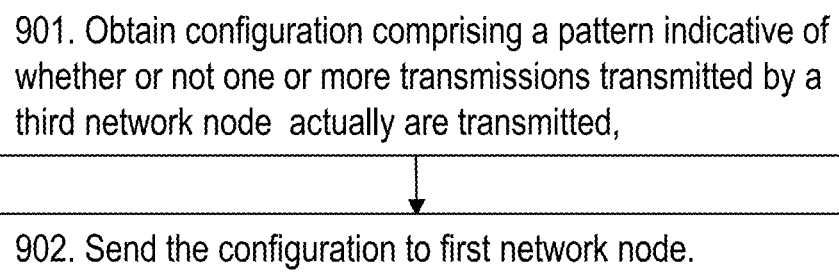
FIG. 9 is a flowchart depicting embodiments of a method in a UE.

Example embodiments of a method performed by the UE 120, e.g. for handling a configuration such as e.g. an SS Block configuration, of neighbour cells in a wireless communications network 100, e.g. an NR communications system will now be described with reference to a flowchart depicted in FIG. 9. The UE 120, the first network node 111, and the third network node 113 operate in the wireless communications network 100.

Some related embodiments will be described later on in this document.

The method may comprise one or more of the following actions which actions may be taken in any suitable order.

In short, the method comprises one or more of the following actions:

In Action 901, the UE 120 obtains a configuration comprising a pattern indicative of whether or not one or more transmissions transmitted by a third network node 113 actually are transmitted, wherein the transmissions comprises any one out of Synchronization Signal, SS, blocks and beams.

In Action 902, the UE 120 sends the configuration to the first network node 112.

In more detail, the method comprises one or more of the following actions: The actions will be yet further explained in paragraphs after the method actions.

Action 902

The UE 120 obtains a configuration comprising a pattern indicative of whether or not one or more transmissions transmitted by the third network node 113 actually are transmitted. The transmissions comprises any one out of SS blocks and beams.

The obtained configuration may be obtained by being any one out of: Decided by the UE 120, and received from the third network node 113. Thus the configuration may be obtained by being decided by the UE 120, or being received from the third network node 113.

The pattern may comprise any one out of: One pattern, and a group of patterns. Thus the pattern may comprise one pattern or a group of patterns.

The pattern may comprises any one out of: a pattern of transmissions and a pattern of UE measurements. Thus the pattern may be a pattern of transmissions or a pattern of UE measurements.

The pattern indicative of whether or not the one or more transmissions actually are transmitted may in some embodiments be represented by a pattern indicative of whether or not the one or more transmissions actually are available for UE measurements.

The configuration may be of any one or more out of: an SS block configuration and a beam configuration. Thus the configuration may be a SS block configuration or a beam configuration.

Action 902

The UE 120 then sends the configuration to the first network node 111.

Figure 10:
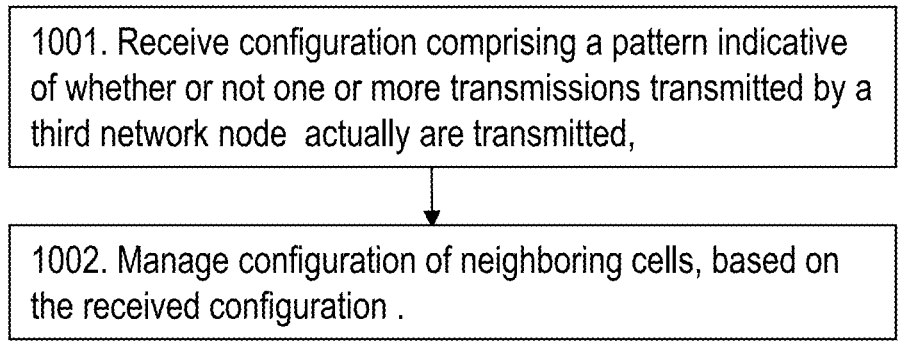
FIG. 10 is a flowchart depicting embodiments of a method in a second network node.

Example embodiments of a method performed by a second network node 112 e.g. for managing a configuration such as e.g. an SS Block configuration of neighbour cells, in a wireless communications network 100 e.g. a New Radio, NR, communications system, will now be described with reference to a flowchart depicted in FIG. 10. The first network node 111, the second network node 112 and the third network node 113 operate in the wireless communications network 100.

Some related embodiments will be described later on in this document.

The method may comprise one or more of the following actions which actions may be taken in any suitable order.

In short, the method comprises one or more of the following actions:

In Action 1001, the second network node 112 receives from the first network node 111, a configuration comprising a pattern indicative of whether or not one or more transmissions transmitted by a third network node 113 actually are transmitted, wherein the transmissions comprises any one out of Synchronization Signal, SS, blocks and beams.

In Action 1002, the second network node 112 manages configuration of neighbouring cells, based on the received configuration.

In more detail, the method comprises one or more of the following actions: The actions will be yet further explained in paragraphs after the method actions.

Action 1001

The second network node 112 receives a configuration from the first network node 111. The configuration comprises a pattern indicative of whether or not one or more transmissions transmitted by a third network node 113 actually are transmitted. The transmissions comprises any one out of SS blocks and beams. Thus the transmissions comprises SS blocks or beams.

The pattern may comprise any one out of: One pattern, and a group of patterns. Thus the pattern may comprise one pattern or a group of patterns.

The pattern may comprises any one out of: a pattern of transmissions and a pattern of UE measurements. Thus the pattern may be a pattern of transmissions or a pattern of UE measurements.

The pattern indicative of whether or not the one or more transmissions actually are transmitted may in some embodiments be represented by a pattern indicative of whether or not the one or more transmissions actually are available for UE measurements.

The configuration may be of any one or more out of: an SS block configuration and a beam configuration. Thus the received configuration may be a SS block configuration or a beam configuration.

Action 1002

The second network node 112 manages the configuration of neighbouring cells, based on the received configuration.

The managing of the configuration of neighbouring cells, based on the received configuration may comprise to perform one or more out of:

sending all or a part of the received configuration to another network node,
sending all or a part of the received configuration to one or more UEs,
configuring measurement gaps,
configuring measurement cycles,
configuring DRX,
updating one or more measurement objects,
reporting configurations for one or more UEs,
configuring the set of SSBs for measurements, —configuring measurement gaps for one or more UEs,
configuring one or more own transmissions,
determining a common set of actually transmitted SSBs by all or at least N cells in a set of cells,
determining a common set of SSBs not transmitted by any cell in a set of cells,
determining a load characteristic or metric based on whether the SSB is transmitted in a neighbour cell or not, and
determining a load characteristic or metric based on whether the SSB is transmitted in a neighbour cell or not.

Embodiments herein will now be further described and exemplified.

Communicating the SS Block and Beam Configuration.
Between Network Nodes

According to some first embodiments, the first network node 111 (e.g., a first BS) obtains and e.g. provides or indicates to the second network node 112 (e.g., a second BS, a core network node, positioning node) the SS block or beam configuration comprising one or a group of patterns indicative of which SS blocks or beams transmitted by a third network node 113 (e.g., the first BS or a third BS) are:

actually transmitted and/or actually not transmitted (e.g., a transmission pattern), and/or
available and/or not available for UE measurements (e.g., a measurement pattern which is always either the same or a subset of the transmission pattern, i.e., an SS block or beam cannot be measured if it is not transmitted; e.g., some SS blocks or beams may be transmitted but subject to high interference or may be not suitable for the UE measurements for some other reason).

Thus according to the first embodiment, the first network node 111, provides or indicates to a second network node 112, an SS block or beam configuration comprising one or a group of patterns indicative of which SS blocks or beams transmitted by a third network node 113, are—actually transmitted and/or actually not transmitted, and/or—available and/or not available for UE measurements.

In one example, the third network node 113 may be the same as the first network node. In another example, the third network node 113 may be different from the first and the second network node 112, in which case the first network node 111 may forward (e.g., transparently or not-transparently to the first network node), relay or retransmit the above configuration to the second network node 112.

The configuration may also indicate the actual SS block transmissions about which the first network node 111 is certain about, e.g., SS block #0, #1, and #3 in the example in above when the determining of the configuration for the third network node 113 is based on UE measurements.

Some more examples of the first, second, and third network nodes 111-113 are BS, relay, a core network node, e.g., Operation and Maintenance (O&M) or Self-Organizing Network (SON), positioning node, e.g., sending the configuration:

from BS or relay to BS, e.g., via Xn interface,
from BS or relay to relay,
from BS or relay to core network node,
from BS or core network node to positioning node,
from core network node to positioning node,
from serving BS to handover target BS,
from serving BS to core network node or positioning node.

In some embodiments, the configuration may be UE specific or associated with UE specific context. This is helpful, e.g., at handover since it may make the target BS aware of the configuration of specific SS blocks configured for UE measurements in the old BS, especially when multiple, e.g. at different frequencies, SS blocks may be transmitted in a cell.

In another embodiment, the configuration may be cell-specific and not associated with any specific UE, e.g., when no multiple SS blocks are transmitted in a cell or when the same pattern of the actually transmitted SS blocks is configured for all frequencies in a cell when multiple SS blocks are transmitted in the cell.

In yet another embodiment, the information such as the configuration is associated with a cell but also with a frequency, e.g., allowing different patterns of the actually transmitted SS blocks at different frequencies in a cell when multiple SS blocks are transmitted in a cell.

There may be a "request message" from the second network node 112 to the first network node 111 indicating that the second network node 112 wants to know the SSB and/or beam configurations associated with the cells and/or frequencies of the first network node 111.

That "request message" may also comprise one or multiple Physical Cell Identity (PCI)s so that the first network node 111 knows for which PCI or Cell Global Identity (CGI) and/or frequency the second network node 112 wants to know the SSB and/or beam configuration;

That "request message" may also comprise one or multiple measurement objects so that the first network node 111 knows for which measurement objects the second network node 112 wants to know the SSB and/or beam configuration;

That "request message" may also comprise a combination of one or multiple measurement objects and/or PCIs or CGIs so that the first network node 111 knows for which measurement objects and/or PCIs or CGIs and/or frequency the second network node 112 wants to know the SSB and/or beam configuration.

There may be a "response message" from the first network node 111 to the second network node 112 indicating the SSB and/or beam configurations per PCI or CGI and/or frequency.

That may be done for all measurement objects associated to that first network node 111 or only to a subset.

That may be done for all PCIs or CGIs and/or frequencies associated to that first node or only to a subset.

That may be done for combinations of measurement objects and/or PCIs or CGIs and/or frequencies associated to that first network node 111 or only to a subset.

There may be an "update request message" from the second network node 112 to the first network node 111 indicating that the second network node 112 wants to obtain the SSB and/or beam configurations updates associated with the cells and/or frequencies of the first network node.

That "update request message" may also comprise one or multiple PCI or CGI and/or frequencies so that the first network node 111 knows for which cell and/or frequency the second network node 112 wants to know the SSB and/or beam configuration;

That "update request message" may also comprise one or multiple measurement objects so that the first network node 111 knows for which measurement objects the second network node 112 wants to know the SSB and/or beam configuration;

That "update request message" may also comprise a combination of one or multiple measurement objects and/or PCIs or CGIs and/or frequencies so that the first network node 111 knows for which measurement objects and/or PCIs or CGIs and/or frequencies the second network node 112 wants to know the SSB and/or beam configuration.

There may be an "update message" from the first network node 111 to the second network node 112 indicating the SSB and/or beam configurations per PCI or CGI and/or frequency has changed:

That may be done for all measurement objects associated to that first network node 111 or only to a subset.

That may be done for all PCIs or CGIs and/or frequencies associated to that first network node 111 or only to a subset.

That may be done for combinations of measurement objects and/or PCIs or CGIs and/or frequencies associated to that first network node 111 or only to a subset.

In another embodiment, the SSB and/or beam configuration may be comprised in a handover-related message, e.g., the configuration in a serving and/or target cell.

Between UE 120 and Network Node

According to another embodiment, a first network node 111 receives from the UE 120 the SS block or beam configuration comprising one or a group of patterns indicative of which SS blocks or beams transmitted by a third network node 113.

Examples of the first network node 111 and/or third network node 113:

Serving BS and/or neighbour BS or any type of radio network node transmitting SS blocks, a core network node and/or BS or any type of radio network node transmitting SS blocks, a positioning node, e.g., Evolved Serving Mobile Location Center (E-SMLC) or a like) and/or BS or any type of radio network node transmitting SS blocks.

The UE 120 may obtain by e.g. determine and send and/or report the configuration in an unsolicited way or upon an explicit or implicit request from the first network node. The configuration may comprise an indication for each of all or of a subset of nominal SS block positions, indicative of that the corresponding SS block is actually transmitted or not. The subset may be requested by the first node or determined based on a pre-defined rule or condition or the signal strength or quality.

The obtaining such as determining may be based on UE measurements/detection attempts of SS blocks at nominal positioning from the third network node 113 or reading a message from the third network node 113, e.g., system information.

In one example, the UE 120 may send the obtained such as determined configuration to the first network node 111, which obtains the configuration by e.g. receiving it from the UE 120, when such configuration was not provided by the first network node 111 to the UE 120, e.g., in measurement configuration or system information.

In another example, the first network node 111 may explicitly request to determine the configuration, e.g., for any detected cell or for a specific cell (e.g., identified by cell identity).

In another example, a first network node 111 configures the UE 120 to detect the SS block pattern, i.e. number of SSBs being transmitted, nominal positions being used, etc., or beam configuration of at least one neighbour cell (e.g. by configuring the UE 120 with a PCI) and report to the first network node 111. One way to perform that configuration is by enhancing the CGI reporting configuration where the UE 120 is provided with a PCI. Based on that, the UE 120 obtains that SSB pattern and/or beam configuration. This may e.g. be performed by reading a system information message from the cell associated to the provided PCI.) The UE 120 sends a measurement report to the first network node 111, e.g. jointly with other information such as cell global identifier, core network information, PLMN information, etc. By having that information, the network may trigger the setup of an inter-node interface, e.g. Xn interface between gNodeBs. That configuration procedure towards the UE 120 may be triggered by the first network node 111 upon receiving a measurement report from the UE 120 associated to a given PCI and, by the first node identifying that it does not have stored information about that PCI regarding its SSB and/or beam configuration.

The word network when used herein may refer to any one or more of the first, second and third network node 111, 112, 113. The word network is used interchangeably with any one or more of the first, second and third network node 111, 112, 113.

When the UE 120 is attempting to detect SS blocks at all nominal locations and reports the results of this (e.g., the UE 120 may report a measurement for each successfully detected SS block and may not report for not detected SS blocks or may report a pre-defined value for not detected SS blocks indicative that the SS block at this nominal location has not been detected), an SS block may be not detected because it is not transmitted or because the signal quality is too low at the UE 120 location. By receiving such UE 120 results, the first network node 111 gets at least aware of the SS blocks that are transmitted for which the measurements are received. The first network node 111 may also combine the results from two or more UE 120s to determine the actually transmitted SS blocks of a cell and/or at a frequency. Example:

The UE 120 detects and reports SS block #0 and SS block #3, while another UE detects and reports SS blocks #1 for the same cell and/or frequency, from which the first network node 111 may conclude that at least SS blocks #0, #1, and #3 are transmitted, while SS block #2 may still be uncertain and possibly may not be transmitted by the third network node 113. The first network node 111 may therefore configure UE measurements assuming that SS block #2 is not transmitted.

In another embodiment, the SSB and/or beam configuration may be comprised in a handover-related message, e.g., the configuration of a serving and/or target cell, communicated to the UE 120 or communicated by the UE 120.

Yet another example embodiment comprises a combination of per frequency indication of present SSBs and/or SSBs to include in measurements and additional per cell indication of the previous mentioned is assumed. Information e.g. comprises A) an indication which SSB are present and which out of those should be taken into account in measurements per a frequency, sort of default value (this may be same as in other embodiments) additionally it has part B) same information but cell specific, list of cells that it applies but denotes more SSBs to be present and/or to be taken into account in measurements.

This means there may be two types of cells on the frequency, all fulfill the per frequency SSB indication but then some cells have more SSBs present. The network such as the first network node 111 or third network node 113 113 may indicate to UE 120 this information in the SSB timing configuration per frequency and the per cell SSB indication for the second timing configuration applicable for a list of cells.

The above mentioned A) and B) info may be given to the UE 120 as mentioned above. As priori art there is SSB timing per frequency, add there information A. Then there is SSB timing per list of cells (which has to fulfill per frequency timing but may have more SSB occasions) add here information B.

An SSB timing configuration may comprise, e.g., subframe number, radio frame number, slot number, an offset with respect to a reference time, e.g., with respect to SFN0 or frame or subframe boundary.

Using the SS Block and Beam Configuration

Second Network Node 112 or First Network Node 111

The second network node 112 receives from the first network node 111 or the first network node 111 obtains by e.g. receiving from one or more UEs 120, the SS block or beam configuration. The second network node 112 or the first network node 111 manages the configuration of neighbouring cells, based on the received configuration by e.g. e.g. performing one or any combination of the below, based on the received configuration:

- Sending all or a part of the received configuration to another network node, e.g., a BS, a core network node, or a positioning node.
- Sending all or a part of the received configuration to one or more UE 120s (e.g., via broadcast, multicast or dedicated higher layer or lower layer signaling), e.g., in the assistance data for UE measurements or in the positioning assistance data for UE 120 positioning measurements or determining UE 120 location.
- Configuring measurement gaps (e.g., the measurement gap length so that a measurement gap may cover all or a specific group of the actually transmitted SSBs while minimizing within the gap the number of SSBs which are not transmitted).
- Configuring measurement cycles (e.g., so that a measurement part of the measurement cycle may cover all or a specific group of the actually transmitted SSBs)—used e.g. for measurements on deactivated configured CCs.
- Configuring DRX (e.g., to align DRX ON periods with the actually transmitted SSBs).
- Updating one or more measurement objects and/or reporting configurations for one or more UE 120s.
  - One parameter that may be updated is the maximum number of beams N, in the measurement object (measObject) used to derive cell quality e.g. by averaging N beam measurement results. If the network knows that neighbour cells associated to a given measObject-x only transmit K beams, the network knows it should not configure the parameter N to be higher than K.
  - Another parameter that may be updated is the maximum number of beams X to be reported per cell and to apply L3 filter to its measurements. If the network is aware that neighbour cells associated to a given measObject-x only transmit K beams, the network knows it should not configure the parameter X to be higher than K. That helps the UE 120 to know it should not setup more than K L3 filters for that particular measurement object and/or cell.
  - In yet another example, the SSB and/or beam configuration of a neighbour cell may be provided to the UE 120 to reduce the UE 120 complexity and resource consumption, as well as to shorten the measurement time.
- Configuring the set of SSBs for measurements, e.g., mobility measurements, Radio Link Monitoring (RLM), positioning measurements, RRM measurements, SON measurements, Minimization of Drive Test (MDT) measurements, etc.
- Configuring measurement gaps for one or more UEs such as the UE 120 based on the received configuration. E.g., a first measurement gap length and/or a first measurement gap periodicity is configured if a first configuration is provided and a second measurement gap length, and/or a second measurement gap periodicity is configured if a second configuration is provided. E.g., shorter gaps may be used if a certain number of SS blocks which are consecutive in time are not transmitted or not available for UE measurements.
- Configuring one or more own transmissions, e.g.,
  - Reducing the number of own SS block or beam transmissions at times overlapping with the SS block or beam transmissions indicated in the received configuration.
  - Changing the transmit power of own SS block or beam transmissions at times overlapping with the SS block or beam transmissions indicated in the received configuration, e.g., reducing the power to reduce the interference from the latter or increasing the power to overcome the interference from the latter.
- Determining a common set of actually transmitted SSBs by all or at least N cells in a set of cells, based on the information about the actually transmitted SSBs for those cells.
- Determining a common set of SSBs not transmitted by any cell in a set of cells.
- Determining a load characteristic or metric based on whether the SSB is transmitted in a neighbour cell, e.g. neighbour interfering cell, or not. E.g., the load is lower if it is not transmitted and the load is higher if it is transmitted.

The UE 120

The UE 120 may use the obtained such as e.g. received SSB and/or beam configuration of a neighbour cell to adapt a measurement procedure, enhance receiver performance, or battery life, e.g. even more specifically any one or more out of:

- Mitigate or cancel the interference from it, to enhance the receiver performance when receiving signals from the serving cell, or Total Radiated Power (TRP), or other neighbour cells, or TRPs.

Avoid blind detection of whether the SSB is actually transmitted or not.

Facilitate SSB-based measurements and reception of the system information (e.g., PBCH which is also comprised in SSB) to perform the measurements and receive the channels/signals that are known to be transmitted.

Sending this information to another network node or another UE.

Adapting UE 120 activity pattern, e.g. no need to stay active when none of the SSBs of interest is transmitted during a time period (e.g., a slot or a subframe).

Switching the UE 120 receiver beam for receiving other signals and/or channels in a different direction at the time when an SSB is actually not transmitted.

A half-duplex UE 120 (e.g., HD-FDD) may transmit in UL or on a side like, e.g. D2D or Vehicle-to-everything (V2X), if none of the SSBs of interest is transmitted in a certain time unit and thus no need to receive.

Switching to another carrier frequency when no SSBs of interest are actually transmitted on a given carrier frequency.

Perform positioning measurements on the actually transmitted SSBs in neighbour cells or neighbour frequencies.

Examples of SS Block and Beam Configuration

In a further example, the SS block or beam configuration may concern the beams used for transmissions of radio signals of a specific type, e.g., radio signals to be used for positioning.

In another example, the SS block or beam configuration may further comprise any one or a combination of:

Cell-specific and/or frequency specific bitmap indicating the actually transmitted SS blocks or one or more groups of SS blocks.

An indication that the SS block or beam configuration for one or more of first cells (e.g., one, some or all neighbour cells) is the same as for a reference cell and/or reference frequency (e.g., serving cell and/or a specific frequency).

An indication that the SS block or beam configuration for a first group of cells is the same as for a second group of cells (a group of cells may be determined based on a pre-defined rule or may comprise a group of cells characterized with the same property characterizing the whole group or may comprise a list of cells).

The number of SS blocks or beams which are transmitted and/or not transmitted and/or available/not available in a cell.

The minimum and/or maximum number of SS blocks or beams which are transmitted and/or not transmitted and/or available/not available in a group of cells or on one or more carrier frequencies.

A common set of SS blocks or beams which are transmitted and/or not transmitted and/or available/not available in all cells within a group of cells or on one or more carrier frequencies.

The SS block or beam configuration may be per cell or for a group of cells and/or for one or more carrier frequencies.

Figure 11:
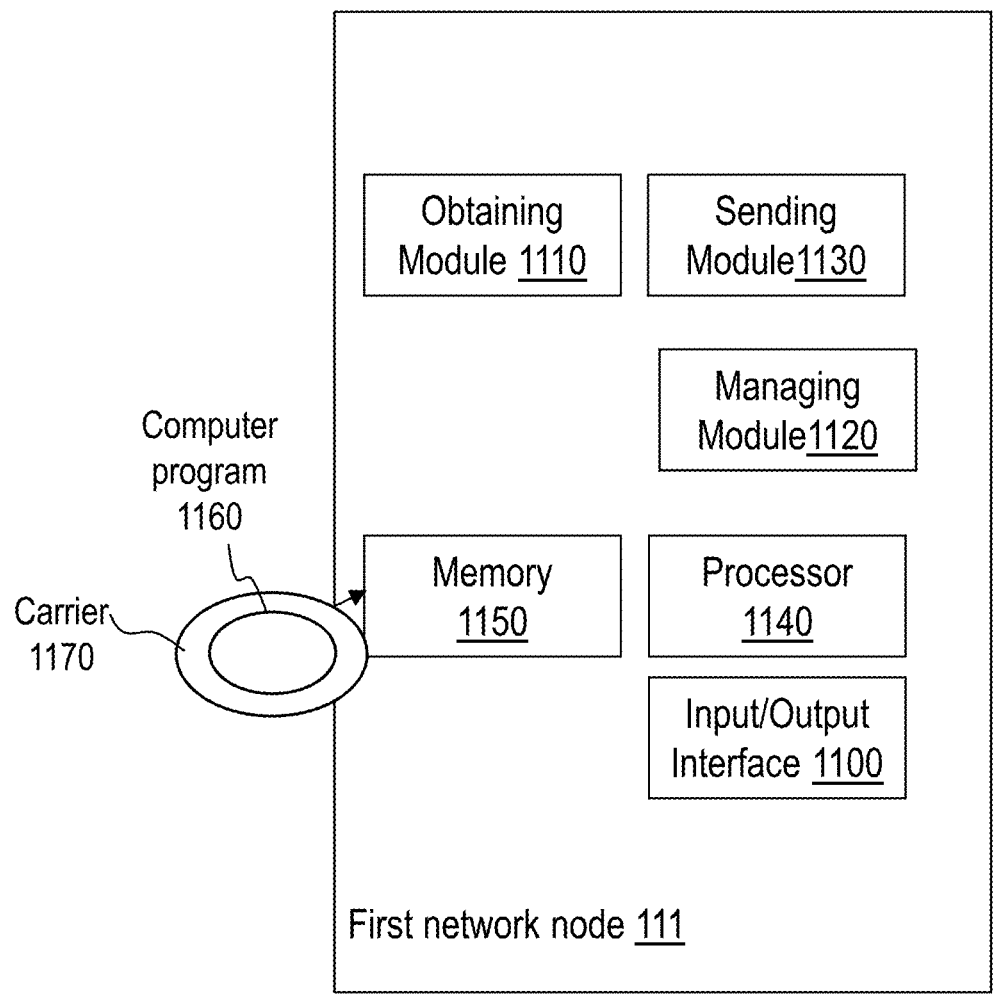
FIG. 11 is a schematic block diagram illustrating embodiments of a first network node.

To perform the method e.g. for managing a configuration such as e.g. an SS Block configuration of neighbour cells, in a wireless communications network (100) e.g. a New Radio, NR, communications system, the first network node 111 may comprise the arrangement depicted in FIG. 11. The first network node 111 may e.g. comprise an obtaining circuit, a managing circuit and a sending circuit.

To perform the method actions e.g. for managing a configurations such as e.g. an SS Block configuration of neighbour cells, the first network node 111 may in some embodiments e.g. comprise a obtaining module 1110, managing module 1120 and a sending module 1130.

Those skilled in the art will also appreciate that the modules and circuits in the first network node 111 described above may refer to a combination of analog and digital circuits, and/or one or more processors configured with software and/or firmware, e.g. stored in the first network node 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The first network node 111 may comprise an input and output interface 1100 configured to communicate with UEs, e.g. with the UE 120. The input and output interface may comprise a wireless receiver (not shown) and a wireless transmitter not (shown).

The embodiments herein may be implemented through a respective processor or one or more processors, such as the processor 1140 of a processing circuitry in the first network node 111 depicted in FIG. 11, together with respective computer program code for performing the functions and actions of the embodiments herein. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1150 comprising one or more memory units. The memory comprises instructions executable by the processor in first network node 111. The memory is arranged to be used to store e.g. data, configurations, indications, and applications to perform the methods herein when being executed in the first network node 111.

In some embodiments, a respective computer program 1160 comprises instructions, which when executed by the respective at least one processor, cause the at least one processor of the first network node 111 to perform the actions above.

In some embodiments, a respective carrier 1170 comprises the respective computer program, wherein the carrier is one of an electronic signal, an optical signal, an electromagnetic signal, a magnetic signal, an electric signal, a radio signal, a microwave signal, or a computer-readable storage medium.

Figure 12:
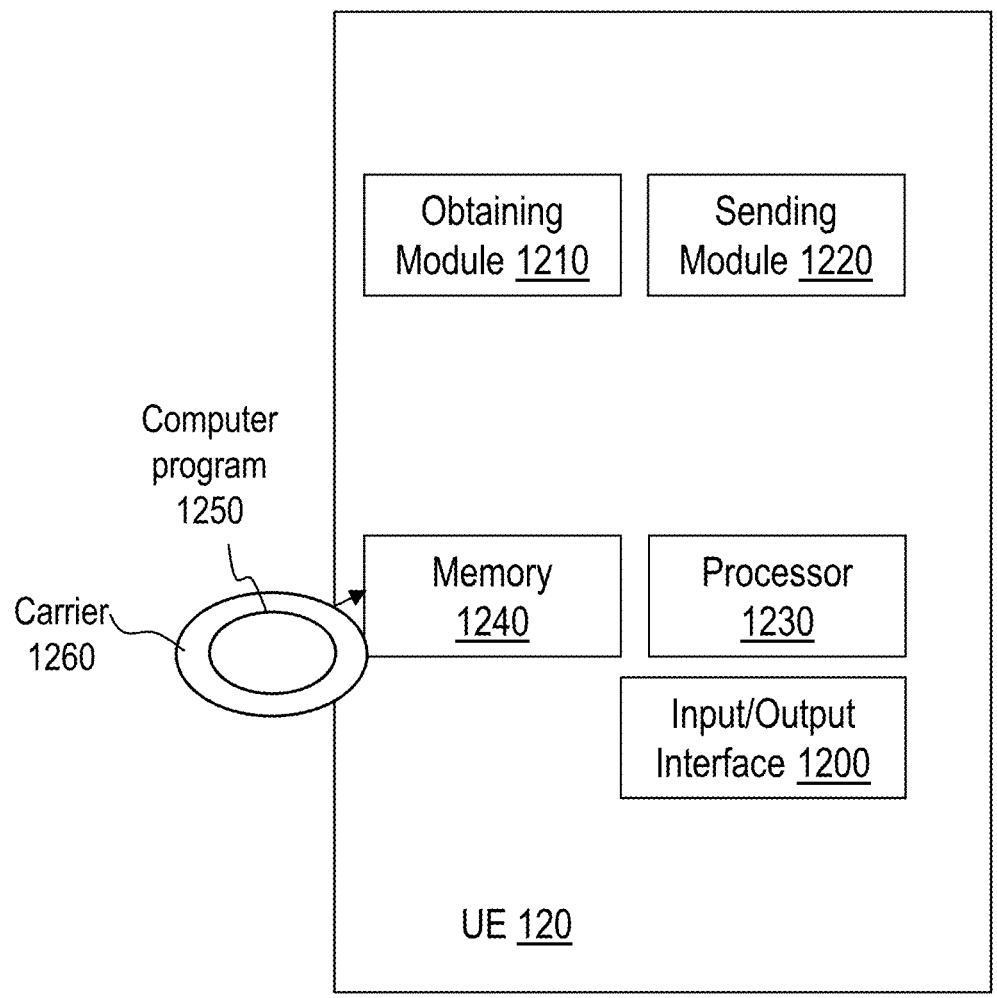
FIG. 12 is a schematic block diagram illustrating embodiments of a UE.

To perform the method actions e.g. for managing a configuration such as e.g. an SS Block configuration of neighbour cells, in a wireless communications network (100) e.g. a New Radio, NR, communications system, the UE 120 may comprise the arrangement depicted in FIG. 12. The UE 120 may e.g. comprise an obtaining circuit, and a sending circuit.

To perform the method actions e perform the method actions e.g. for managing a configuration such as e.g. an SS Block configuration of neighbour cells, the UE 120 may in some embodiments e.g. comprise a obtaining module 1210, and a sending module 1220.

Those skilled in the art will also appreciate that the modules and circuits in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The UE 120 may comprise an input and output interface 1200 configured to communicate e.g. with the network node 111. The input and output interface may comprise a wireless receiver (not shown) and a wireless transmitter not (shown).

The embodiments herein may be implemented through a respective processor or one or more processors, such as the processor 1230 of a processing circuitry in the UE 120 depicted in FIG. 12, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1240 comprising one or more memory units. The memory comprises instructions executable by the processor in. The memory is arranged to be used to store e.g. data, configurations, indications, and applications to perform the methods herein when being executed in the UE 120.

In some embodiments, a respective computer program 1250 comprises instructions, which when executed by the respective at least one processor, cause the at least one processor of the UE 120 to perform the actions above.

In some embodiments, a respective carrier 1260 comprises the respective computer program, wherein the carrier is one of an electronic signal, an optical signal, an electromagnetic signal, a magnetic signal, an electric signal, a radio signal, a microwave signal, or a computer-readable storage medium.

Figure 13:
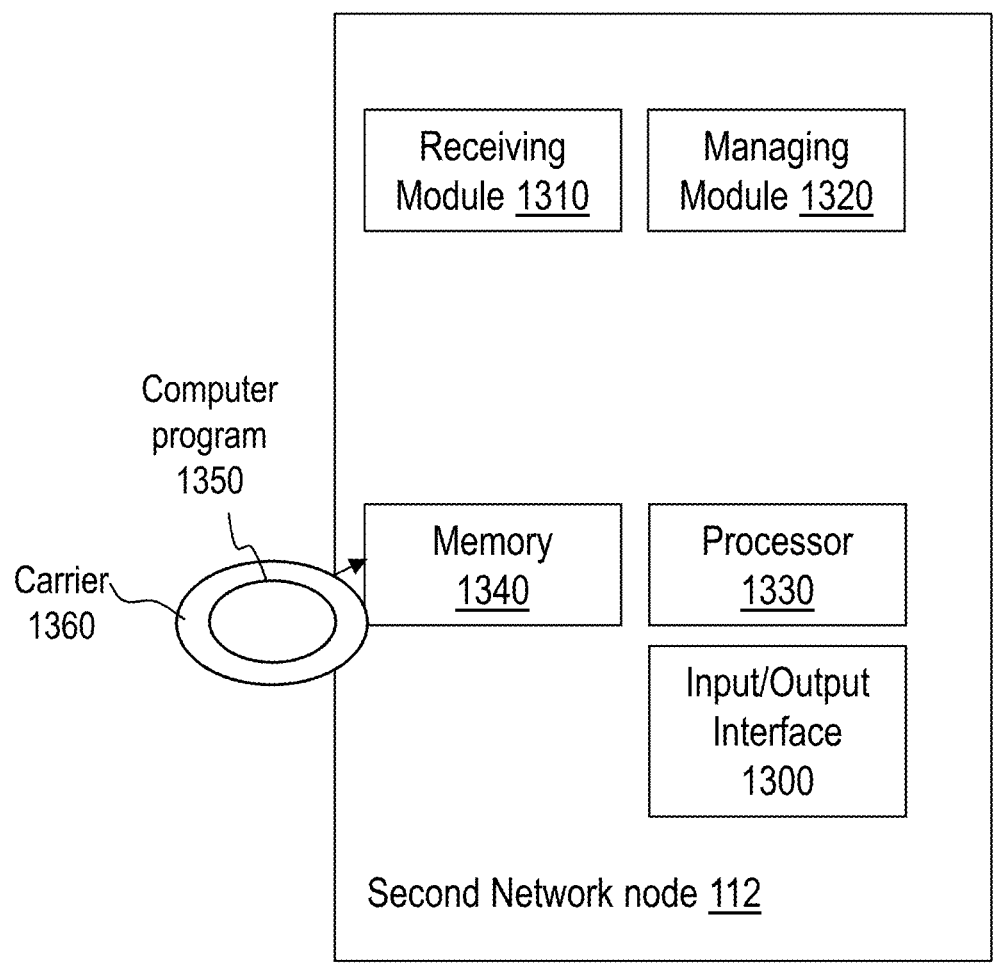
FIG. 13 is a schematic block diagram illustrating embodiments of a second network node.

To perform the method actions e.g. for managing a configuration such as e.g. an SS Block configuration of neighbour cells, in a wireless communications network (100) e.g. a New Radio, NR, communications system, the second network node 112 may comprise the arrangement depicted in FIG. 13. The network node 111 may e.g. comprise a receiving circuit and a managing circuit.

To perform the method actions e.g. for managing a configuration such as e.g. an SS Block configuration of neighbour cells, the second network node 112 may in some embodiments e.g. comprise a receiving module 1310, and a managing module 1320.

Those skilled in the art will also appreciate that the modules and circuits in the second network node 112 described above may refer to a combination of analog and digital circuits, and/or one or more processors configured with software and/or firmware, e.g. stored in the second network node 112, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The second network node 112 may comprise an input and output interface 1300 configured to communicate e.g. with the UE 120. The input and output interface may comprise a wireless receiver (not shown) and a wireless transmitter not (shown).

The embodiments herein may be implemented through a respective processor or one or more processors, such as the processor 1330 of a processing circuitry in the second network node 112 depicted in FIG. 12, together with respective computer program code for performing the functions and actions of the embodiments herein. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1340 comprising one or more memory units. The memory comprises instructions executable by the processor in the second network node 112. The memory is arranged to be used to store e.g. data, configurations, indications, and applications to perform the methods herein when being executed in second network node 112.

In some embodiments, a respective computer program 1350 comprises instructions, which when executed by the respective at least one processor, cause the at least one processor of the second network node 112 to perform the actions above.

In some embodiments, a respective carrier 1360 comprises the respective computer program, wherein the carrier is one of an electronic signal, an optical signal, an electromagnetic signal, a magnetic signal, an electric signal, a radio signal, a microwave signal, or a computer-readable storage medium.

Some first example apparatus embodiments numbered 27-46 are described below.

The following embodiments refer e.g. to FIG. 11-13.

27. A first network node 111 for managing a configuration of neighbouring cells in a wireless communications network 100 communications system, wherein the first network node 111 and a third network node 113 are operable in the wireless communications network 100, the first network node 111 comprising a processor 1140 and a memory 1150 containing instructions executable by the processor whereby the first network node 111 is configured to:

obtain a configuration comprising a pattern indicative of whether or not one or more transmissions transmitted by a third network node 113 actually are transmitted, wherein the transmissions is adapted to comprise any one out of Synchronization Signal, SS, blocks and beams, and manage the configuration of neighbouring cells, based on the received configuration.

28. The first network node 111 according to embodiment 27, wherein the pattern is adapted to comprise any one out of: one pattern and a group of patterns.

29. The first network node 111 according to any of the embodiments 27-28, wherein according to embodiment 1, wherein the pattern is adapted to comprise any one out of: a pattern of transmissions and a pattern of UE measurements.

30. The first network node 111 according to any of the embodiments 27-29, wherein the pattern indicative of whether or not the one or more transmissions actually are transmitted is adapted to be represented by: a pattern indicative of whether or not the one or more transmissions actually are available for UE measurements.

31. The first network node 111 according to any of the embodiments 27-30, wherein the configuration is adapted to be of any one or more out of: an SS block configuration and a beam configuration.

32. The first network node 111 according to any of the embodiments 27-31, wherein the obtained configuration is adapted to be obtained by being any one out of:
    decided by the first network node 111, received from one or more User Equipments, UEs, 120, and received from the third network node 113.

33. The first network node 111 according to any of the embodiments 27-32, wherein the third network node 113 is adapted to be the same network node as the first network node 111.

34. The first network node 111 according to any of the embodiments 27-33, further being configured to manage the configuration of neighbouring cells, based on the received configuration by performing one or more out of:
    send all or a part of the received configuration to another network node,
    sending all or a part of the received configuration to one or more UEs,
    configure measurement gaps,
    configuring measurement cycles,
    configuring Discontinuous Reception, DRX,
    update one or more measurement objects,
    reporting configurations for one or more UEs,
    configure the set of SSBs for measurements,
    configure measurement gaps for one or more UEs,
    configure one or more own transmissions,
    determining a common set of actually transmitted SSBs by all or at least N cells in a set of cells,
    determine a common set of SSBs not transmitted by any cell in a set of cells,
    determine a load characteristic or metric based on whether the SSB is transmitted in a neighbour cell or not,
    determine a load characteristic or metric based on whether the SSB is transmitted in a neighbour cell or not, and
    send the configuration to a second network node 112, wherein the second network node 112 operate in the wireless communications network 100.

35. A User Equipment, UE, 120, for handling a configuration of neighbouring cells in a wireless communications network 100, wherein the UE 120, a first network node 111, and a third network node 113 are operable in the wireless communications network 100, the UE 120 comprising a processor 1230 and a memory 1240 containing instructions executable by the processor whereby the UE 120 is configured to:
    obtain, a configuration adapted to comprise a pattern indicative of whether or not one or more transmissions transmitted by a third network node 113 actually are transmitted, wherein the transmissions are adapted to comprise any one out of Synchronization Signal, SS, blocks and beams, and
    send, the configuration to the first network node 111.

36. The UE 120 according to embodiment 35, wherein the pattern is adapted to comprise any one out of: one pattern and a group of patterns.

37. The UE 120 according to any of the embodiments 35-36, wherein the pattern is adapted to comprise any one out of: a pattern of transmissions and a pattern of UE measurements.

38. The UE 120 according to any of the embodiments 35-37, wherein the pattern indicative of whether or not the one or more transmissions actually are transmitted is adapted to represented by: a pattern indicative of whether or not the one or more transmissions actually are available for UE measurements.

39. The UE 120 according to any of the embodiments 35-38, wherein the configuration is adapted to be of any one or more out of: an SS block configuration and a beam configuration.

40. The UE 120 according to any of the embodiments 35-39, wherein the configuration is adapted to be obtained by being any one out of:
    decided by the UE 120, and received from the third network node 113.

41. A second network node 112 for handling a configuration of neighbouring cells in a wireless communications network 100, wherein a first network node 111, the second network node 112 and a third network node 113 are operable in the wireless communications network 100, the second network node 112 comprising a processor 1330 and a memory 1340 containing instructions executable by the processor whereby the second network node 112 is configured to:
    receive, from the first network node 111, a configuration adapted to comprise a pattern indicative of whether or not one or more transmissions transmitted by a third network node 113 actually are transmitted, wherein the transmissions is adapted to comprise any one out of Synchronization Signal, SS, blocks and beams, and
    manage the configuration of neighbouring cells, based on the received configuration.

42. The second network node 112 according to embodiment 41, wherein the pattern is adapted to comprise any one out of: one pattern and a group of patterns.

43. The second network node 112 according to any of the embodiments 41-42, wherein according to embodiment 1, wherein the pattern is adapted to comprise any one out of: a pattern of transmissions and a pattern of UE measurements.

44. The second network node 112 according to any of the embodiments 41-43, wherein the pattern indicative of whether or not the one or more transmissions actually are transmitted is adapted to be represented by: a pattern indicative of whether or not the one or more transmissions actually are available for UE measurements.

45. The second network node 112 according to any of the embodiments 41-44, wherein the configuration is adapted to be of any one or more out of: an SS block configuration and a beam configuration.

46. The second network node 112 according to any of the embodiments 41-45, wherein the second network node 112 further is configured to manage, the configuration of neighbouring cells, based on the received configuration perform one or more out of:
    send all or a part of the received configuration to another network node,
    send all or a part of the received configuration to one or more UEs,
    configure measurement gaps, configure measurement cycles,
configuring Discontinuous Reception, DRX,
update one or more measurement objects,
reporting configurations for one or more UEs,
configure the set of SSBs for measurements,
configure measurement gaps for one or more UEs,
configure one or more own transmissions,
determine a common set of actually transmitted SSBs by all or at least N cells in a set of cells,
determine a common set of SSBs not transmitted by any cell in a set of cells,
determine a load characteristic or metric based on whether the SSB is transmitted in a neighbour cell or not, and
determine a load characteristic or metric based on whether the SSB is transmitted in a neighbour cell or not.

Some second example apparatus embodiments numbered 27-46 are described below. The following embodiments refer e.g. to FIG. 11-13.

27. A first network node 111 for managing a configuration of neighbouring cells in a wireless communications network 100 communications system, wherein the first network node 111 and a third network node 113 are operable in the wireless communications network 100, the first network node 111 comprising:
an obtaining circuit 1110 configured to obtain a configuration comprising a pattern indicative of whether or not one or more transmissions transmitted by a third network node 113 actually are transmitted, wherein the transmissions is adapted to comprise any one out of Synchronization Signal, SS, blocks and beams, and a managing circuit 1120 configured to manage the configuration of neighbouring cells, based on the received configuration.

28. The first network node 111 according to embodiment 27, wherein the pattern is adapted to comprise any one out of: one pattern and a group of patterns.

29. The first network node 111 according to any of the embodiments 27-28, wherein according to embodiment 1, wherein the pattern is adapted to comprise any one out of: a pattern of transmissions and a pattern of UE measurements.

30. The first network node 111 according to any of the embodiments 27-29, wherein the pattern indicative of whether or not the one or more transmissions actually are transmitted is adapted to be represented by: a pattern indicative of whether or not the one or more transmissions] actually are available for UE measurements.

31. The first network node 111 according to any of the embodiments 27-30, wherein the configuration is adapted to be of any one or more out of: an SS block configuration and a beam configuration.

32. The first network node 111 according to any of the embodiments 27-31, wherein the obtained configuration is adapted to be obtained by being any one out of:
decided by the first network node 111, received from one or more User Equipments, UEs, 120, and received from the third network node 113.

33. The first network node 111 according to any of the embodiments 27-32, wherein the third network node 113 is adapted to be the same network node as the first network node 111.

34. The first network node 111 according to any of the embodiments 27-33, further being configured to manage the configuration of neighbouring cells, based on the received configuration by performing one or more out of:
send all or a part of the received configuration to another network node,
sending all or a part of the received configuration to one or more UEs,
configure measurement gaps,
configuring measurement cycles,
configuring Discontinuous Reception, DRX,
update one or more measurement objects,
reporting configurations for one or more UEs,
configure the set of SSBs for measurements,
configure measurement gaps for one or more UEs,
configure one or more own transmissions,
determining a common set of actually transmitted SSBs by all or at least N cells in a set of cells,
determine a common set of SSBs not transmitted by any cell in a set of cells,
determine a load characteristic or metric based on whether the SSB is transmitted in a neighbour cell or not,
determine a load characteristic or metric based on whether the SSB is transmitted in a neighbour cell or not, and
by means of a sending circuit 1130 send the configuration to a second network node 112, wherein the second network node 112 operate in the wireless communications network 100.

35. A User Equipment, UE, 120, for handling a configuration of neighbouring cells in a wireless communications network 100, wherein the UE 120, a first network node 111, and a third network node 113 are operable in the wireless communications network 100, the UE 120 comprising:
an obtaining circuit 1210 configured to obtain, a configuration adapted to comprise a pattern indicative of whether or not one or more transmissions transmitted by a third network node 113 actually are transmitted, wherein the transmissions are adapted to comprise any one out of Synchronization Signal, SS, blocks and beams, and
a sending circuit 1220 configured to send, the configuration to the first network node 111.

36. The UE 120 according to embodiment 35, wherein the pattern is adapted to comprise any one out of: one pattern and a group of patterns.

37. The UE 120 according to any of the embodiments 35-36, wherein the pattern is adapted to comprise any one out of: a pattern of transmissions and a pattern of UE measurements.

38. The UE 120 according to any of the embodiments 35-37, wherein the pattern indicative of whether or not the one or more transmissions actually are transmitted is adapted to represented by: a pattern indicative of whether or not the one or more transmissions actually are available for UE measurements.

39. The UE 120 according to any of the embodiments 35-38, wherein the configuration is adapted to be of any one or more out of: an SS block configuration and a beam configuration.

40. The UE 120 according to any of the embodiments 35-39, wherein the configuration is adapted to be obtained by being any one out of:
decided by the UE 120, and received from the third network node 113.

41. A second network node 112 for handling a configuration of neighbouring cells in a wireless communications network 100, wherein a first network node 111, the second network node 112 and a third network node 113 are operable in the wireless communications network 100, the second network node 112 comprising:
a receiving circuit 1310 configured to receive, from the first network node 111, a configuration adapted to comprise a pattern indicative of whether or not one or more transmissions transmitted by a third network node 113 actually are transmitted, wherein the transmissions is adapted to comprise any one out of Synchronization Signal, SS, blocks and beams, and a managing circuit 1310 configured to manage the configuration of neighbouring cells, based on the received configuration.

42. The second network node 112 according to embodiment 41, wherein the pattern is adapted to comprise any one out of: one pattern and a group of patterns.

43. The second network node 112 according to any of the embodiments 41-42, wherein according to embodiment 1, wherein the pattern is adapted to comprise any one out of: a pattern of transmissions and a pattern of UE measurements.

44. The second network node 112 according to any of the embodiments 41-43, wherein the pattern indicative of whether or not the one or more transmissions actually are transmitted is adapted to be represented by: a pattern indicative of whether or not the one or more transmissions actually are available for UE measurements.

45. The second network node 112 according to any of the embodiments 41-44, wherein the configuration is adapted to be of any one or more out of: an SS block configuration and a beam configuration.

46. The second network node 112 according to any of the embodiments 41-45, wherein the second network node 112 further is configured to manage, the configuration of neighbouring cells, based on the received configuration perform one or more out of:

send all or a part of the received configuration to another network node,
send all or a part of the received configuration to one or more UEs,
configure measurement gaps,
configure measurement cycles,
configuring Discontinuous Reception, DRX,
update one or more measurement objects,
reporting configurations for one or more UEs,
configure the set of SSBs for measurements,
configure measurement gaps for one or more UEs,
configure one or more own transmissions,
determine a common set of actually transmitted SSBs by all or at least N cells in a set of cells,
determine a common set of SSBs not transmitted by any cell in a set of cells,
determine a load characteristic or metric based on whether the SSB is transmitted in a neighbour cell or not, and
determine a load characteristic or metric based on whether the SSB is transmitted in a neighbour cell or not.

Some further example Embodiments numbered 1-44 are described below. The following embodiments refer e.g. to FIG. 7-13.

1. A method performed by a first network node 111 e.g. for managing a configuration such as e.g. an SS Block configuration of neighbour cells, in a wireless communications network 100 e.g. a New Radio, NR, communications system, wherein the first network node 111, a second network node 112 and a third network node 113 operate in the wireless communications network 100, the method comprising:

obtaining, 801, a configuration comprising a pattern indicative of whether or not one or more transmissions transmitted by a third network node 113 actually are transmitted, wherein the transmissions comprises any one out of Synchronization Signal, SS, blocks and beams, and managing 802 configuration of neighbouring cells, based on the received configuration e.g. by performing one or more out of: —sending all or a part of the received configuration to another network node, —sending all or a part of the received configuration to one or more UEs, —configuring measurement gaps, —configuring measurement cycles, —configuring DRX, —updating one or more measurement objects and/or reporting configurations for one or more UEs, —Configuring the set of SSBs for measurements, —configuring measurement gaps for one or more UEs, —configuring one or more own transmissions, —determining a common set of actually transmitted SSBs by all or at least N cells in a set of cells, —determining a common set of SSBs not transmitted by any cell in a set of cells, —determining a load characteristic or metric based on whether the SSB is transmitted in a neighbour interfering cell or not, and—determining a load characteristic or metric based on whether the SSB is transmitted in a neighbour interfering cell or not, such as e.g. sending 802, the configuration to a second network node 112

2. The method according to embodiment 1, wherein the pattern comprises any one out of: one pattern and a group of patterns.

3. The method according to any of the embodiments 1-2, wherein according to embodiment 1, wherein the pattern comprises any one out of: a pattern of transmissions and a pattern of UE measurements.

4. The method according to any of the embodiments 1-3, wherein the pattern indicative of whether or not one or more transmissions actually are transmitted is represented by: a measurements pattern indicative of whether or not one or more measurements actually are available for UE measurements.

5. The method according to any of the embodiments 1-4, wherein the configuration is of any one or more out of: an SS block and a beam.

6. The method according to any of the embodiments 1-5, wherein the configuration is obtained by being any one out of:

decided by the first network node 111, received from one or more User Equipments, UEs, 120, and received from the third network node 113.

7. The method according to any of the embodiments 1-6, wherein the third network node 113 is the same network node as the first network node 111.

8. A computer program comprising instructions, which when executed by a processor, causes the processor to perform actions according to any of the embodiments 1-7.

9. A carrier comprising the computer program of embodiment 8, wherein the carrier is one of an electronic signal, an optical signal, an electromagnetic signal, a magnetic signal, an electric signal, a radio signal, a microwave signal, or a computer-readable storage medium.

10. A method performed by User Equipment, UE, 120, e.g. for handling a configuration such as e.g. an SS Block configuration of neighbour cells, in a wireless communications network 100 e.g. a New Radio, NR, communications system, wherein the UE 120, a first network node 111, and a third network node 113 operate in the wireless 30 communications network 100, the method comprising:

obtaining, 901, a configuration comprising a pattern indicative of whether or not one or more transmissions transmitted by a third network node 113 actually are transmitted, wherein the transmissions comprises any one out of Synchronization Signal, SS, blocks and beams, and sending, 902 the configuration to the first network node 112.

11. The method according to embodiment 10, wherein the pattern comprises any one out of: one pattern and a group of patterns.

12. The method according to any of the embodiments 10-11, wherein the pattern comprises any one out of: a pattern of transmissions and a pattern of UE measurements.

13. The method according to any of the embodiments 10-12, wherein the pattern indicative of whether or not one or more transmissions actually are transmitted is represented by: a measurements pattern indicative of whether or not one or more measurements actually are available for UE measurements.

14. The method according to any of the embodiments 10-13, wherein the configuration is of any one or more out of: an SS block and a beam.

15. The method according to any of the embodiments 10-14, wherein the configuration is obtained by being any one out of:
 decided by the UE 120, and received from the third network node 113.

16. A computer program comprising instructions, which when executed by a processor, causes the processor to perform actions according to any of the embodiments 10-15.

17. A carrier comprising the computer program of embodiment 16, wherein the carrier is one of an electronic signal, an optical signal, an electromagnetic signal, a magnetic signal, an electric signal, a radio signal, a microwave signal, or a computer-readable storage medium.

18. A method performed by a second network node 112 e.g. for managing a configuration such as e.g. an SS Block configuration of neighbour cells, in a wireless communications network 100 e.g. a New Radio, NR, communications system, wherein a first network node 111, the second network node 112 and a third network node 113 operate in the wireless communications network 100, the method comprising:
 receiving, 1001 from the first network node 111, a configuration comprising a pattern indicative of whether or not one or more transmissions transmitted by a third network node 113 actually are transmitted, wherein the transmissions comprises any one out of Synchronization Signal, SS, blocks and beams, and
 managing 1002 configuration of neighbouring cells, based on the received configuration e.g. by performing one or more out of: —sending all or a part of the received configuration to another network node, —sending all or a part of the received configuration to one or more UEs, —configuring measurement gaps, —configuring measurement cycles, —configuring DRX, —updating one or more measurement objects and/or reporting configurations for one or more UEs, —Configuring the set of SSBs for measurements, —configuring measurement gaps for one or more UEs, —configuring one or more own transmissions, —determining a common set of actually transmitted SSBs by all or at least N cells in a set of cells, —determining a common set of SSBs not transmitted by any cell in a set of cells, —determining a load characteristic or metric based on whether the SSB is transmitted in a neighbour interfering cell or not, and—determining a load characteristic or metric based on whether the SSB is transmitted in a neighbour interfering cell or not.

19. The method according to embodiment 18, wherein the pattern comprises any one out of: one pattern and a group of patterns.

20. The method according to any of the embodiments 18-19, wherein according to embodiment 1, wherein the pattern comprises any one out of: a pattern of transmissions and a pattern of UE measurements.

21. The method according to any of the embodiments 18-20, wherein the pattern indicative of whether or not one or more transmissions actually are transmitted is represented by: a measurements pattern indicative of whether or not one or more measurements actually are available for UE measurements.

22. The method according to any of the embodiments 18-21, wherein the configuration is of any one or more out of: an SS block and a beam.

23. A computer program comprising instructions, which when executed by a processor, causes the processor to perform actions according to any of the embodiments 18-22.

24. A carrier comprising the computer program of embodiment 23, wherein the carrier is one of an electronic signal, an optical signal, an electromagnetic signal, a magnetic signal, an electric signal, a radio signal, a microwave signal, or a computer-readable storage medium.

25. A first network node 111 e.g. for managing a configuration, such as e.g. an SS Block configuration of neighbour cells, in a wireless communications network 100 e.g. a New Radio, NR, communications system, wherein the first network node 111, a second network node 112 and a third network node 113 are operable in the wireless communications network 100, the first network node 111 being configured to:
 obtain, e.g. by means of an obtaining circuit 1110 and/or module, a configuration comprising a pattern indicative of whether or not one or more transmissions transmitted by a third network node 113 actually are transmitted, wherein the transmissions is adapted to comprise any one out of Synchronization Signal, SS, blocks and beams, and
 send, e.g. by means of a sending circuit 1130 and/or module, the configuration to a second network node 112.

26. The first network node 111 according to embodiment 25, wherein the pattern is adapted to comprise any one out of: one pattern and a group of patterns.

27. The first network node 111 according to any of the embodiments 25-26, wherein according to embodiment 1, wherein the pattern is adapted to comprise any one out of: a pattern of transmissions and a pattern of UE measurements.

28. The first network node 111 according to any of the embodiments 25-27, wherein the pattern indicative of whether or not one or more transmissions actually are transmitted is adapted to be represented by: a measurements pattern indicative of whether or not one or more measurements actually are available for UE measurements.

29. The first network node 111 according to any of the embodiments 25-28, wherein the configuration is adapted to be of any one or more out of: an SS block and a beam.

30. The first network node 111 according to any of the embodiments 25-29, wherein the configuration is adapted to be obtained by being any one out of:
 decided by the first network node 111, received from one or more User Equipments, UEs, 120, and received from the third network node 113.

31. The first network node 111 according to any of the embodiments 25-30, wherein the third network node 113 is adapted to be the same network node as the first network node 111.

32. A User Equipment, UE, 120, e.g. for handling a configuration such as e.g. an SS Block configuration of neighbour cells, in a wireless communications network 100 e.g. a New Radio, NR, communications system, wherein the UE 120, a first network node 111, and a third network node 113 are operable in the wireless communications network 100, the UE 120 being configured to:

obtain, e.g. by means of an obtaining circuit and/or module, a configuration is adapted to comprise a pattern indicative of whether or not one or more transmissions transmitted by a third network node 113 actually are transmitted, wherein the transmissions are adapted to comprise any one out of Synchronization Signal, SS, blocks and beams, and send, e.g. by means of a sending circuit and/or module, the configuration to the first network node 112.

33. The UE 120 according to embodiment 32, wherein the pattern is adapted to comprise any one out of: one pattern and a group of patterns.

34. The UE 120 according to any of the embodiments 32-33, wherein the pattern is adapted to comprise any one out of: a pattern of transmissions and a pattern of UE measurements.

35. The UE 120 according to any of the embodiments 32-34, wherein the pattern indicative of whether or not one or more transmissions actually are transmitted is adapted to represented by: a measurements pattern indicative of whether or not one or more measurements actually are available for UE measurements.

36. The UE 120 according to any of the embodiments 32-35, wherein the configuration is adapted to be of any one or more out of: an SS block and a beam.

37. The UE 120 according to any of the embodiments 32-36, wherein the configuration is adapted to be obtained by being any one out of:

decided by the UE 120, and received from the third network node 113.

38. A second network node 112 e.g. for managing a configuration e.g. of neighbouring cells, in a wireless communications network 100 e.g. a New Radio, NR, communications system, wherein a first network node 111, the second network node 112 and a third network node 113 are operable in the wireless communications network 100, the second network node 112 comprising:

receive, e.g. by means of a receiving circuit and/or module, from the first network node 111, a configuration adapted to comprise a pattern indicative of whether or not one or more transmissions transmitted by a third network node 113 actually are transmitted, wherein the transmissions is adapted to comprise any one out of Synchronization Signal, SS, blocks and beams, and manage, e.g. by means of a managing circuit and/or module, configuration of neighbouring cells, based on the received configuration e.g. by based on the received configuration perform, one or more out of: —sending all or a part of the received configuration to another network node, —sending all or a part of the received configuration to one or more UEs, —configuring measurement gaps, —configuring measurement cycles, —configuring DRX, —updating one or more measurement objects and/or reporting configurations for one or more UEs, —Configuring the set of SSBs for measurements, —configuring measurement gaps for one or more UEs, —configuring one or more own transmissions, —determining a common set of actually transmitted SSBs by all or at least N cells in a set of cells, —determining a common set of SSBs not transmitted by any cell in a set of cells, —determining a load characteristic or metric based on whether the SSB is transmitted in a neighbour interfering cell or not, and—determining a load characteristic or metric based on whether the SSB is transmitted in a neighbour interfering cell or not.

39. The second network node 112 according to embodiment 38, wherein the pattern is adapted to comprise any one out of: one pattern and a group of patterns.

40. The second network node 112 according to any of the embodiments 38-39, wherein according to embodiment 1, wherein the pattern is adapted to comprise any one out of: a pattern of transmissions and a pattern of UE measurements.

41. The second network node 112 according to any of the embodiments 38-40, wherein the pattern indicative of whether or not one or more transmissions actually are transmitted is adapted to be represented by: a measurements pattern indicative of whether or not one or more measurements actually are available for UE measurements.

42. The second network node 112 according to any of the embodiments 38-41, wherein the configuration is adapted to be of any one or more out of: an SS block and a beam.

Further Extensions and Variations

Figure 14:
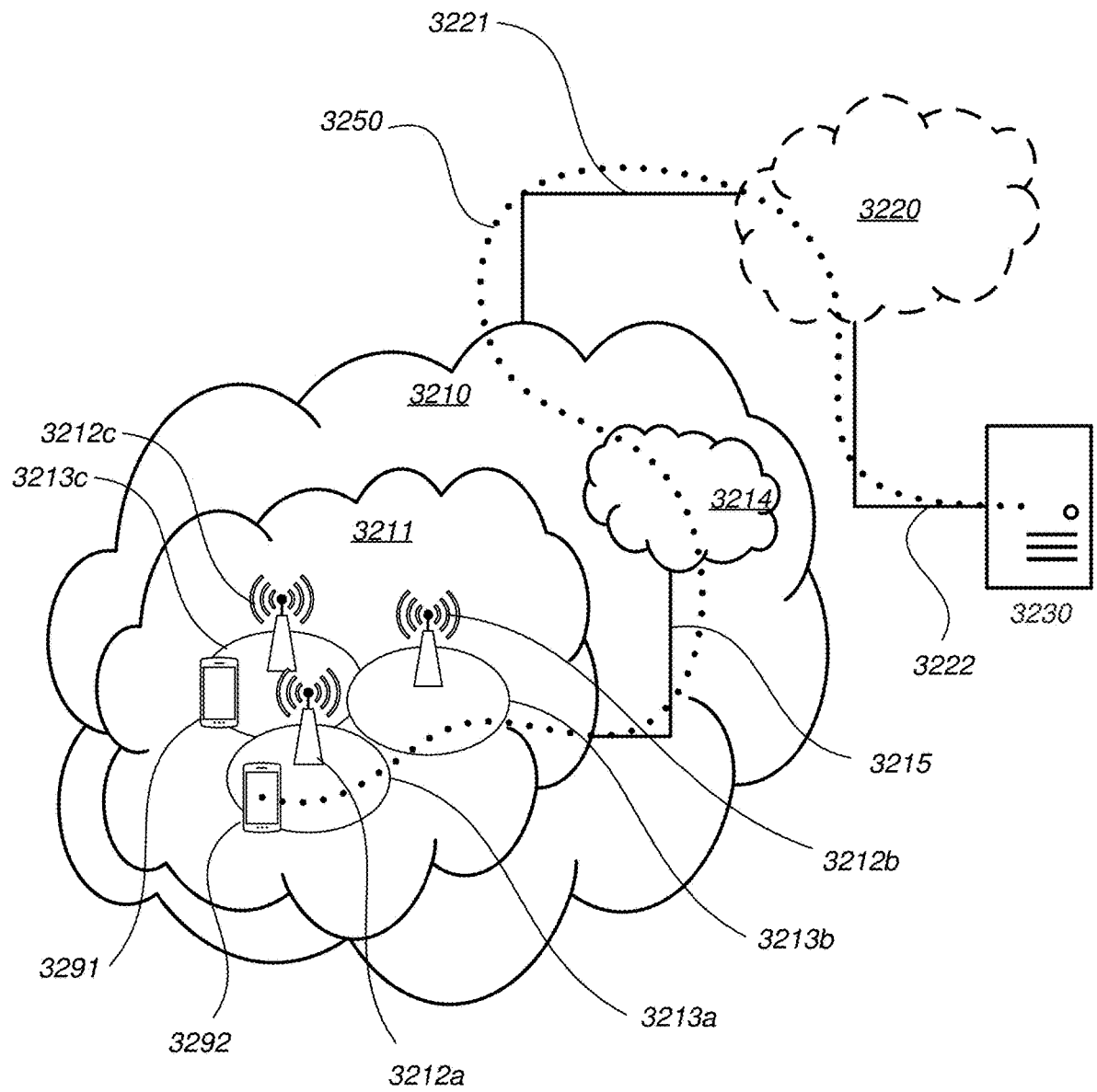
FIG. 14 schematically illustrates a telecommunication network connected via an intermediate network to a host computer.

With reference to FIG. 14, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the first second and third network node 111, 112, 113, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the UE 120 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 15 may be identical to the host computer 3230, one of the base stations 3212a, 3212b, 3212c and one of the UEs 3291, 3292 of FIG. 14, respectively. This is to say, the inner workings of these entities may be as shown in FIG. 15 and independently, the surrounding network topology may be that of FIG. 14.

Figure 15:
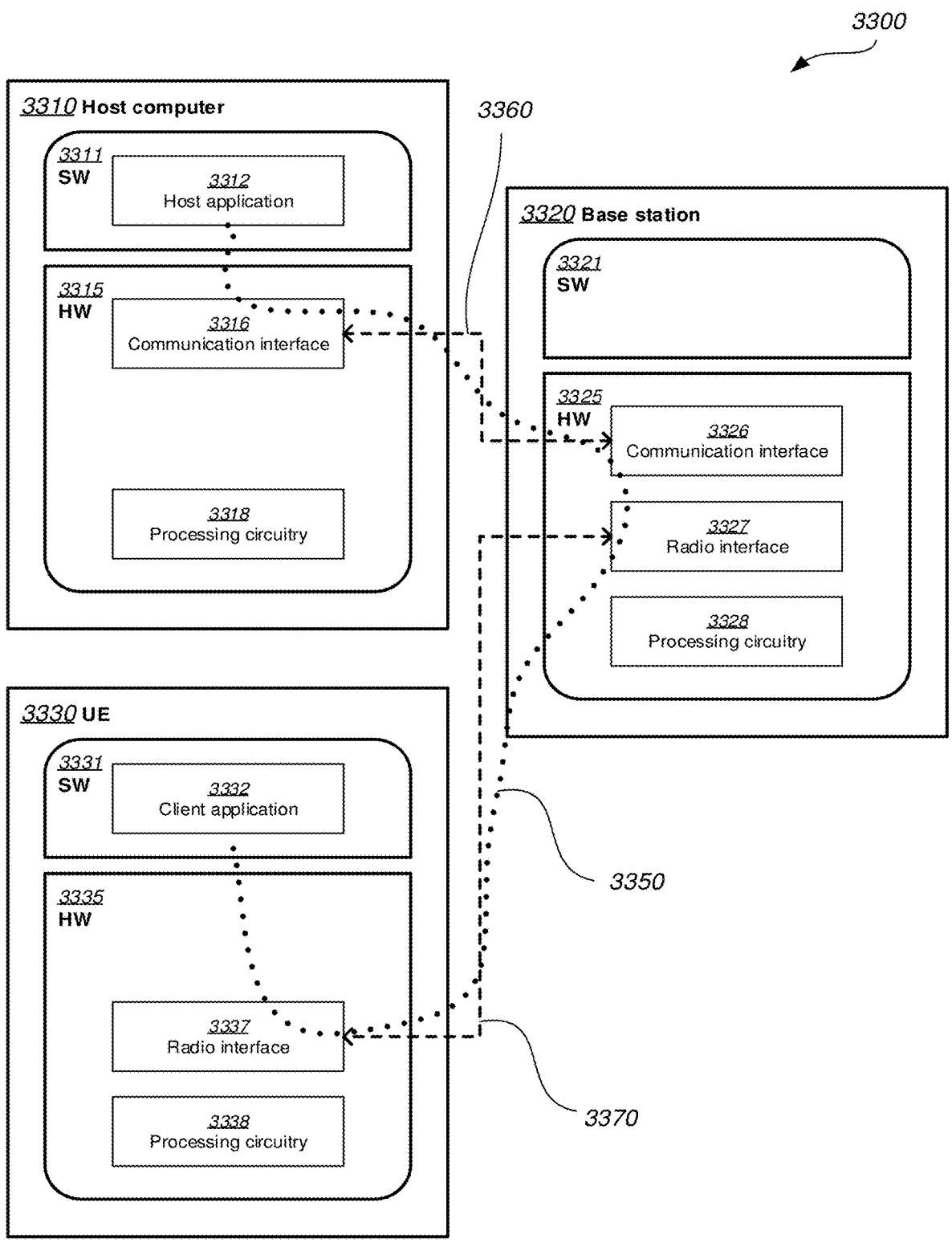
FIG. 15 is a generalized block diagram of a host computer communicating via a base station with a user equipment over a partially wireless connection.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 16 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 17 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 18:
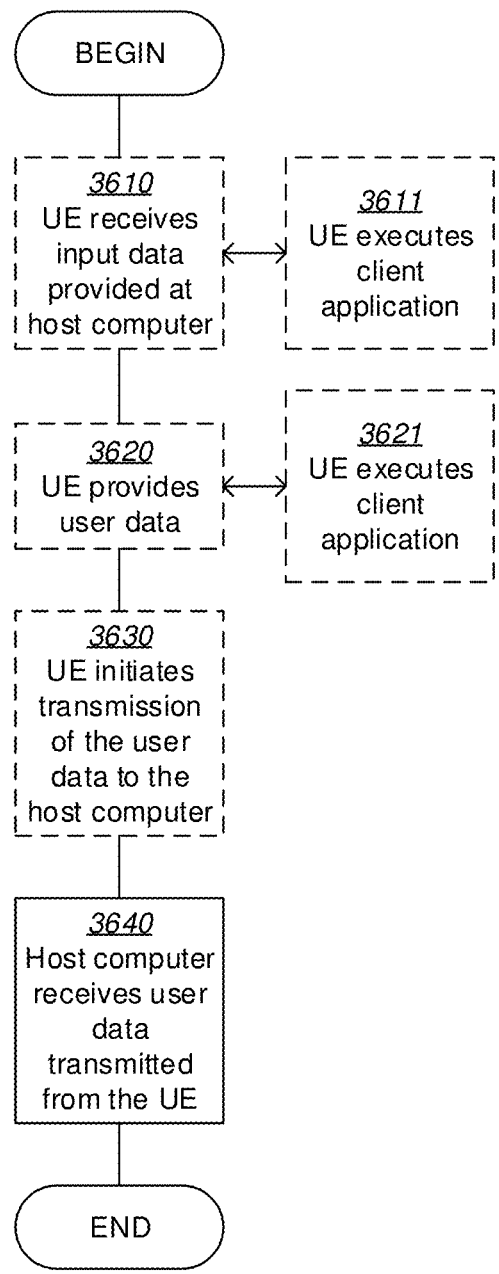

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 18 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 19:
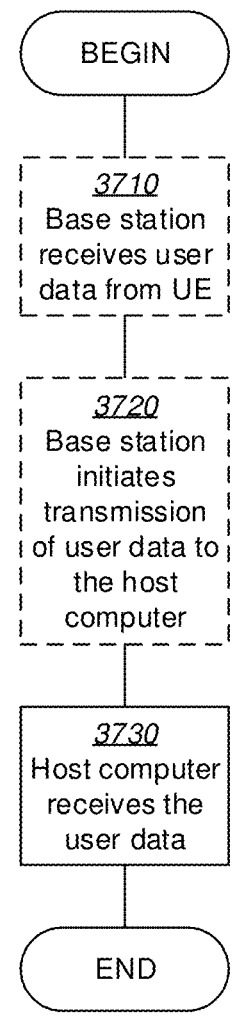

FIG. 19 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 19 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a second network node in a wireless communications network that includes a first network node, the second network node, and a third network node, the method comprising:
receiving, from the first network node, a configuration comprising a pattern indicative of whether or not each of a plurality of Synchronization Signal Block (SSB) transmissions, that are configured based on a nominal timing, are actually transmitted by the third network node according to the nominal timing; and
based on the received configuration, managing transmission and/or reception configurations for one or more of the following:
one or more cells served by the second network node; and
one or more UEs served by the second network node via the one or more cells.

2. The method of claim 1, wherein managing transmission and/or reception configurations for one or more UEs comprises configuring the one or more UEs with measurement gaps during which the one or more UEs can measure SSBs that are actually transmitted by the third network node.

3. The method of claim 2, wherein each measurement gap covers at least a portion of the actually transmitted SSBs while minimizing coverage of configured SSBs that are not actually transmitted.

4. The method of claim 2, wherein:
the one or more UEs are configured with measurement gaps having a first gap length and/or a first gap periodicity when the received configuration matches a first configuration or a first configuration type; and
the one or more UEs are configured with measurement gaps having a second gap length and/or a second gap periodicity when the received configuration matches a second configuration or a second configuration type.

5. The method of claim 1, wherein managing transmission and/or reception configurations for one or more UEs comprises configuring the one or more UEs with discontinuous reception (DRX) ON periods during which the one or more UEs can measure SSBs that are actually transmitted by the third network node.

6. The method of claim 1, wherein managing transmission and/or reception configurations for one or more UEs comprises configuring the one or more UEs with measurement objects and/or a measurement reporting configuration for UE measurements of one or more neighbouring cells served by the third network node, based on actually transmitted SSBs associated with the respective neighbouring cells.

7. The method of claim 6, wherein one or more of the following is based on the total numbers of actually transmitted SSBs associated with the respective neighboring cells:
- in the measurement objects, respective maximum numbers of beams used to determine quality for the respective neighboring cells, and
- in the measurement reporting configuration, respective maximum numbers of beams to be filtered and/or reported for the respective neighboring cells.

8. The method of claim 6, wherein the measurement objects include indications of actually transmitted SSBs associated with each of the neighboring cells.

9. The method of claim 1, wherein managing the transmission and/or reception configuration for the one or more cells served by the second network node comprises configuring SSB transmissions in the one or more cells according to one or more of the following:
- with transmission times that at least reduce overlap with SSBs actually transmitted by the third network node; and
- with reduced or increased transmission power for SSB transmission times that overlap SSBs actually transmitted by the third network node.

10. The method of claim 1, wherein managing the transmission and/or reception configuration for the one or more cells served by the second network node is based on at least one of the following determined from the received configuration:
- a common set of SSBs actually transmitted by the third network node in at least a plurality (N) of neighbouring cells, wherein the plurality (N) is less than all of the neighbouring cells;
- a common set of SSBs not actually transmitted by the third network node in any of the neighbouring cells; and
- for each neighbouring cell, a load characteristic or metric based on whether an SSB is actually transmitted in the neighbouring cell.

11. A second network node of a wireless communications network that includes a first network node, the second network node, and a third network node, the second network node comprising:
- at least one processor; and
- memory storing computer-executable instructions that, when executed by the at least one processor, configure the second network node to:
  - receive, from the first network node, a configuration comprising a pattern indicative of whether or not each of a plurality of Synchronization Signal Block (SSB) transmissions, that are configured based on a nominal timing, are actually transmitted by the third network node according to the nominal timing; and
  - based on the received configuration, manage transmission and/or reception configurations for one or more of the following:
    - one or more cells served by the second network node; and
    - one or more UEs served by the second network node via the one or more cells.

12. The second network node of claim 11, wherein execution of the instructions configures the second network node to manage transmission and/or reception configurations for one or more UEs based on configuring the one or more UEs with measurement gaps during which the one or more UEs can measure SSB s that are actually transmitted by the third network node.

13. The second network of claim 12, wherein each measurement gap covers at least a portion of the actually transmitted SSBs while minimizing coverage of configured SSBs that are not actually transmitted.

14. The second network node of claim 12, wherein:
- the one or more UEs are configured with measurement gaps having a first gap length and/or a first gap periodicity when the received configuration matches a first configuration or a first configuration type; and
- the one or more UEs are configured with measurement gaps having a second gap length and/or a second gap periodicity when the received configuration matches a second configuration or a second configuration type.

15. The second network node of claim 11, wherein execution of the instructions configures the second network node to manage transmission and/or reception configurations for one or more UEs based on configuring the one or more UEs with discontinuous reception (DRX) ON periods during which the one or more UEs can measure SSBs that are actually transmitted by the third network node.

16. The second network node of claim 11, wherein execution of the instructions configures the second network node to manage transmission and/or reception configurations for one or more UEs based on configuring the one or more UEs with measurement objects and/or a measurement reporting configuration for UE measurements of one or more neighbouring cells served by the third network node, based on actually transmitted SSBs associated with the respective neighbouring cells.

17. The second network node of claim 16, wherein one or more of the following is based on the total numbers of actually transmitted SSBs associated with the respective neighboring cells:
- in the measurement objects, respective maximum numbers of beams used to determine quality for the respective neighboring cells, and
- in the measurement reporting configuration, respective maximum numbers of beams to be filtered and/or reported for the respective neighboring cells.

18. The second network node of claim 16, wherein the measurement objects include indications of actually transmitted SSBs associated with each of the neighboring cells.

19. The second network node of claim 11, wherein execution of the instructions configures the second network node to manage transmission and/or reception configurations for one or more UEs based on configuring SSB transmissions in the one or more cells according to one or more of the following:
- with transmission times that at least reduce overlap with SSBs actually transmitted by the third network node; and
- with reduced or increased transmission power for SSB transmission times that overlap SSBs actually transmitted by the third network node.

20. The second network node of claim 11, wherein execution of the instructions configures the second network node to manage transmission and/or reception configurations for one or more UEs based on at least one of the following determined from the received configuration:
- a common set of SSBs actually transmitted by the third network node in at least a plurality (N) of neighbouring cells, wherein the plurality (N) is less than all of the neighboring cells;
- a common set of SSBs not actually transmitted by the third network node in any of the neighbouring cells; and
- for each neighbouring cell, a load characteristic or metric based on whether an SSB is actually transmitted in the neighbouring cell.

21. A non-transitory, computer-readable medium storing computer-executable instructions that, when executed by a processor comprising a second network node of a wireless communication network, configure the second network node to perform operations corresponding to the method of claim 1.

* * * * *